US011575430B2

(12) United States Patent
Babich

(10) Patent No.: US 11,575,430 B2
(45) Date of Patent: *Feb. 7, 2023

(54) METHOD AND SYSTEM OF PRECONDITIONING TRANSMITTED SIGNALS

(71) Applicant: Skywave Networks LLC, Chicago, IL (US)

(72) Inventor: Kevin J. Babich, Valparaiso, IN (US)

(73) Assignee: Skywave Networks LLC, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/305,262

(22) Filed: Jul. 2, 2021

(65) Prior Publication Data

US 2022/0182136 A1 Jun. 9, 2022

Related U.S. Application Data

(63) Continuation of application No. 15/929,248, filed on Apr. 2, 2020, now Pat. No. 11,057,103, which is a
(Continued)

(51) Int. Cl.
*H04B 7/22* (2006.01)
*H04B 10/2575* (2013.01)

(52) U.S. Cl.
CPC ......... *H04B 7/22* (2013.01); *H04B 10/25752* (2013.01)

(58) Field of Classification Search
CPC .......................... H04B 7/22; H04B 10/25752
See application file for complete search history.

(56) References Cited

U.S. PATENT DOCUMENTS 3,940,694 A 2/1976 Price et al.
5,230,076 A * 7/1993 Wilkinson ........... H04B 17/309
375/150

(Continued)

FOREIGN PATENT DOCUMENTS

| JP | 2016115952 A | 9/2016 |
|---|---|---|
| WO | 2001052450 A2 | 7/2001 |
| WO | 2002032020 A1 | 4/2002 |

OTHER PUBLICATIONS

Arikan, Toros, Thesis—Minimum-Delay HF Communications, University of Illinois at Urbana-Champaign, 60 pages Retrieved from the Internet: https://www.ideals.illinois.edu/bitstream/handle/2142/97507/ARIKAN-THESIS-2017.pdf?sequence=1, Nov. 28, 2017.

(Continued)

*Primary Examiner* — Rahel Guarino
(74) *Attorney, Agent, or Firm* — Woodard, Emhardt, Henry, Reeves & Wagner, LLP

(57) ABSTRACT

A communication system transmits data signals between communication nodes. A first data signal is transmitted as an electromagnetic wave along a first data transmission path to a receiver using skywave propagation. A second data signal, identical to the first data signal, is transmitted to the receiver along a second data transmission path. The two data signals are compared at the receiver to determine any distortion caused by the skywave propagation. Data regarding the distortion is sent back to the transmitter so that subsequent transmitted data signals may be preconditioned when sent by skywave propagation.

20 Claims, 11 Drawing Sheets

Related U.S. Application Data continuation of application No. PCT/US2018/053949, filed on Oct. 2, 2018.

(60) Provisional application No. 62/567,444, filed on Oct. 3, 2017.

(56) References Cited

U.S. PATENT DOCUMENTS

| | | |
|---|---|---|
| 6,173,161 B1 | 1/2001 | Gross, Jr. |
| 6,185,408 B1 | 2/2001 | Leopold et al. |
| 6,252,912 B1 | 6/2001 | Salinger |
| 6,285,859 B1 | 9/2001 | Duran et al. |
| 6,725,018 B1 | 4/2004 | Gross, Jr. |
| 7,711,030 B2 | 5/2010 | Perlman |
| 8,755,694 B2 | 6/2014 | Eiselt |
| 9,136,938 B1 | 9/2015 | Babich |
| 9,819,370 B2 | 11/2017 | Ishikawa et al. |
| 11,057,103 B2 * | 7/2021 | Babich ............ H04B 10/25752 |
| 2014/0086588 A1 | 3/2014 | Kawanishi et al. |
| 2014/0281840 A1 | 9/2014 | Mula et al. |
| 2015/0263760 A1 | 9/2015 | Hof et al. |
| 2016/0119004 A1 | 4/2016 | Rollins |
| 2017/0033915 A1 | 2/2017 | McCoy et al. |

OTHER PUBLICATIONS

PCT, Intl. App. No. PCT/US2018/053949 International Search Report, 3 pages, dated Apr. 12, 2019.
PCT, Intl. App. No. PCT/US2018/053949 Written Opinion of the International Searching Authority, 8 pages, dated Apr. 12, 2019.
PCT, Intl. App. No. PCT/US2018/053949 International Preliminary Report on Patentability, 9 Pages, dated Apr. 8, 2020.
EPO, European Patent Application 18863938.9 Extended European Search Report, dated May 27, 2021.

* cited by examiner

METHOD AND SYSTEM OF PRECONDITIONING TRANSMITTED SIGNALS

CROSS-REFERENCE TO RELATED APPLICATION

This application is a continuation of U.S. patent application Ser. No. 15/929,248, filed Apr. 2, 2020, which is hereby incorporated by reference. U.S. patent application Ser. No. 15/929,248, filed Apr. 2, 2020, is a continuation of International Patent Application Number PCT/US2018/053949, filed Oct. 2, 2018, which are hereby incorporated by reference. International Patent Application Number PCT/US2018/053949, filed Oct. 2, 2018, claims the benefit of U.S. Patent Application No. 62/567,444, filed Oct. 3, 2017, which are hereby incorporated by reference.

BACKGROUND

Skywave propagation may be an effective communication method for providing low-latency data transmission between a transmitter and a receiver that are separated by a large distance. Although skywave propagation may reduce transmission times compared to other methods of communication such as fiber optic cables and satellite networks, distortion caused by ionospheric and other atmospheric conditions may cause a delay in processing the data signal as the data signal is unscrambled. In some instances, these delays may prove to be costly. For example, orders to buy and sell securities or other financial instruments in world markets, or even news pertinent to trading strategies, typically rely on communications links that carry data and instructions and delays of even a few milliseconds can cost millions of dollars. Therefore, it may be beneficial to have a communication system that that can reduce the effect of distortion caused by ionospheric conditions on skywave propagation.

SUMMARY

Skywave propagation may be used to provide a low-latency communication pathway for data between remotely located transmitter and receiver stations. Ionospheric and other atmospheric conditions may cause distortion of a data signal transmitted by skywave propagation. Generally speaking, monitoring ionospheric and other environmental conditions may allow a transmitter to change or precondition a data signal to the current conditions such that the current atmospheric conditions effectively unscramble or remove noise from the preconditioned signal when received at the receiver station. The overall system is designed to minimize latency as well as reduce noise of the signal. In this system, a fiber back channel provides a copy of the data signal transmitted via skywave propagation. At a receiver station, the data is decoded. Based on the copy of the signal originally received from the fiber channel, the receiver station can determine what distortions occurred in the atmosphere as it unscrambles the signals transmitted via skywave propagation. Once it receives these parameters, it transmits some or all of this information back to the transmitter station via the fiber channel and/or via skywave propagation. The transmitter station then preconditions one or more of the next signals that are transmitted via skywave propagation.

Preconditioning reduces any type of downstream processing time required to unscramble or remove noise from the signal. In other words, the environmental conditions are in essence performing some or all of the descrambling so as to reduce processing time at the receiver. In one variation, the system can precondition multiple variations of signals to be transmitted. These items can correspond to a particular trading strategy that is used and/or news impacting the trading strategy. The trader can then pick an item from the list to be transmitted and the particular information signal can then be immediately transmitted via skywave propagation.

While the system will be described with reference to executing financial trading strategies, this system and technique can be used in other situations or industries where time and bandwidth are of concern. For example, this system can be used to perform remote surgery or medical diagnostics, scientific instruments or studies (e.g., for astronomy or physics), controlling dispersed global computer networks, and/or military applications. This system and technique can for example be adapted for incorporation into earthquake/tsunami early warning systems. Certain remote deep water earthquake sensor may provide a signal to institute a complicated cascade of actions to protect designated population centers and associated infrastructure depending on the severity and type of earthquake. For instance, upon detecting an earthquake (or resulting tsunami), a sensor or monitoring center can transmit a signal that causes nuclear reactors to immediately scram and/or the power grid to reroute power to emergency infrastructure to alleviate the situation. In another example, the technique can be used for underlying maintenance or enhancements to the communication system itself. By way of a non-limiting example, since the files are typically large, code for programming and/or reprograming the modems, antennas, and/or other equipment at the receiver station (or transmitter station) can be sent along a high bandwidth, high latency link, such as a fiber optic cable. Alternatively or additionally, some or all of the code can be sent via skywave propagation (e.g., radio), and/or via line of site transmission, such as via microwaves. The code can includes one or more programs, libraries, data, and/or subroutines for controlling the equipment depending on various circumstances. The transmitter station via skywave propagation can send a triggering signal to the receiver so as to select all or part of the code to execute so as to modify or reprogram the equipment at the receiver station. For instance, the code can be used to tune the receiver station for particular characteristics, such as for reducing latency, power consumption, and/or error (and/or increasing bandwidth). These tuning characteristics can include tradeoffs that do not work well under certain operational conditions, times, and/or environmental characteristics. One subroutine in the code for example can be optimized for latency reduction, another for error reduction, and still yet another for conserving power. The triggering signal in this example can be used to select one of these subroutines so as to reprogram the receiver depending on the needs at that particular time. The resulting changes can be software changes that change the function of the equipment and/or physical changes to the equipment, such as to the height and/or angle of the antenna system. Later on, depending on the needs at that time, different subroutines, programs, data, and/or areas of the code can be selected via the triggering signal. Updates or changes to the code can be sent periodically, continuously, or on an as needed basis.

Some changes or distortions along the skywave propagation path are predictable and/or occur at such a slow rate so as to make them suitable for this preconditioning technique so as to for example reduce overall communication latency, reduce errors, and/or free up bandwidth. It was discovered for example that the environmental changes for Doppler shifting (or drift over time) along the skywave path, which changes the frequency of the received triggering signal, can occur at a slow enough pace so as to make it suitable for preconditioning. A full or partial inverse factor of this Doppler shift in one variation is applied to the triggering signal before or during transmission. As an example, when the Doppler shift along the skywave path reduces the frequency of the triggering signal, the receiver station reports this lower frequency and/or frequency change back to the transmitter station along the fiber back channel and/or skywave path (or some other communication link). Based on the reported change of frequency, the transmitter for some or all subsequent transmissions increases the frequency of the triggering signal by a factor corresponding to or around this Doppler shift frequency change. As a result of this frequency increase of the transmitted triggering signal, the received triggering signal will likely reduce or even cancel out the Doppler shifting which in turn potentially reduces signal processing time and/or errors. Other signal characteristics, such as amplitude, polarization, and/or phase, can be used for preconditioning the signal. For instance, an inverse function of a detected noise signal that can include frequency, amplitude, polarization, and/or phase distortion components can be applied so as to precondition any subsequently transmitted triggering signals.

As might be appreciated, preconditioning may not be perfect. In one example, the receiver station progresses through or runs parallel light, medium, and heavy decoding of the signal in cases where the preconditioning does not provide adequate descrambling. The light decoding method typically, but not always, has the quickest processing time so that the information can be transmitted more quickly. In one particular example, the receiver system progresses through the light, medium, and heavy decoding methods and once a particular signal has been decoded, it stops at the one that has the shortest processing time that is able to unscramble the signal. As discussed, this processing can go in parallel as well. Once the information from the data signals gets unscrambled, the data is transmitted further on for further use, such as to a financial institution for financial trading.

Further forms, objects, features, aspects, benefits, advantages, and embodiments of the present invention will become apparent from a detailed description and drawings provided herewith.

DESCRIPTION OF THE SELECTED EMBODIMENTS

Figure 1:
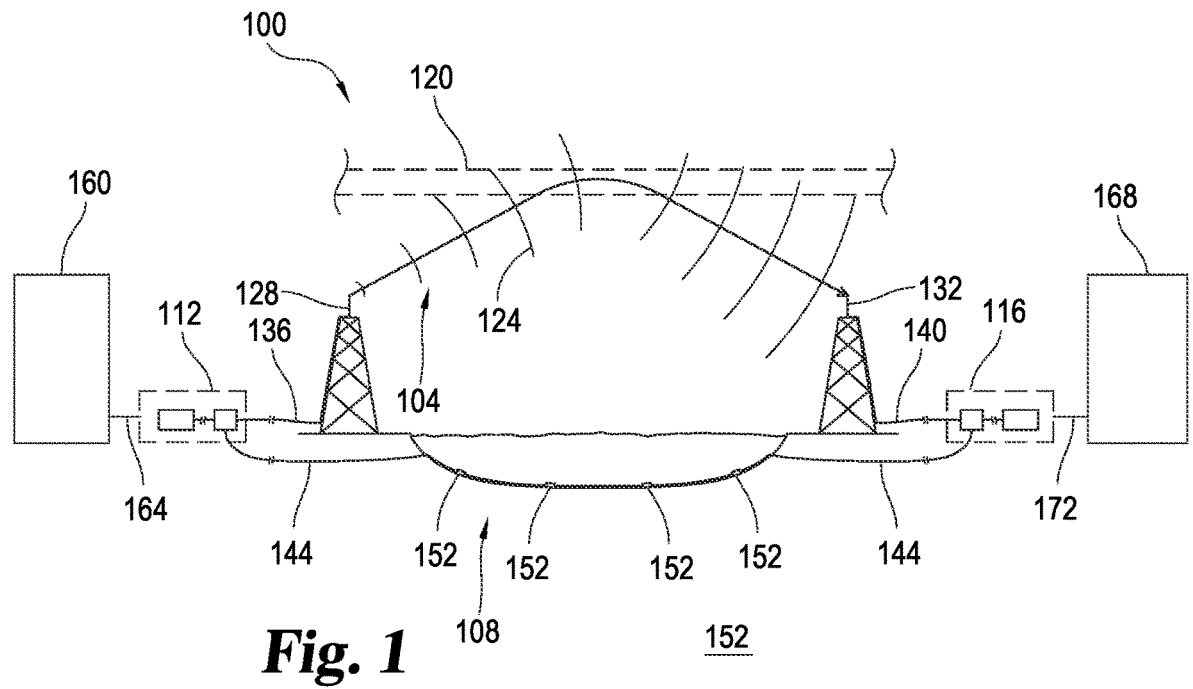
FIG. 1 is a schematic diagram of a system for transmitting data over separate communication links, one of which uses skywave propagation.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

FIG. 1 illustrates at 100 one example of a system configured to transfer data via a low latency, low bandwidth communication link 104, and separate data via a high latency, high bandwidth communication link 108. The communication links 104 and 108 provide separate connections between a first communication node 112 and a second communication node 116. The low latency communication link 104 may be configured to transmit data using electromagnetic waves 124 passing through free space via skywave propagation. The electromagnetic waves 124 may be generated by a transmitter in the first communication node 112 and passed along a transmission line 136 to an antenna 128. The electromagnetic waves 124 may be radiated by the antenna 128 encountering an ionized portion of the atmosphere 120. This radiated electromagnetic energy may then be refracted by the ionized portion of the atmosphere 120 causing the waves 124 to redirect toward earth. The waves 124 may be received by a receiving antenna 132 coupled to the second communications node 116 by the transmission line 140. As illustrated in FIG. 1, a transmitting communication node may use skywave propagation to transmit electromagnetic energy long distances across the earth surface without the need of one or more transmission lines to carry the electromagnetic energy.

Data may also be transmitted between the communications nodes 112 and 116 using a high latency communication link 108. As illustrated in FIG. 1, the high latency communication link 108 may be implemented using a transmission line 144 passing through the earth, which may include passing under or through an ocean or other body of water. As shown in FIG. 1, the high latency communication link 108 may include repeaters 152. FIG. 1 illustrates four repeaters 152 along the transmission line 144 although any suitable number of repeaters 152 may be used. The transmission line 144 may also have no repeaters at all. Although FIG. 1 illustrates the communication link 104 transmitting information from the first communication node 112 to the second communication node 116, the data transmitted may pass along the communication links 104, 108 in both directions.

A client 160 may have a connection 164 to the first communication node 112. The client 160 may send instructions over the connection 164 to the first communication node 112. At the first communication node 112, the instructions are prepared to be sent to the second communication node 116, either by the low latency link 104 or the high latency link 108, or both. The second communication node 116 may be connected to an instruction processor 168 by a connection 172. The client 160 may be any business, group, individual, or entity that desires to send directions over a distance. The instruction processor 168 may be any business, group, individual, or entity that is meant to receive or act upon those instructions. In some embodiments, the connections 164 and 172 may be unnecessary as the client may send the data to be transmitted directly from the communication node 112 or the communication node 116 may be connected directly to the instruction processor 168. The system 100 may be used for any kind of low-latency data transmission that is desired. As one example, the client 160 may be a doctor or surgeon working remotely while the instruction processor 168 may be a robotic instrument for working on a patient.

In some embodiments, the client 160 may be a financial instrument trader and the instruction processor 168 may be a stock exchange. The trader may wish to provide instructions to the stock exchange to buy or sell certain securities or bonds at specific times. In other variations, instead of specific instructions from the trader, the transmitted information or instructions may alternatively or additionally include news information, such as news about a particular company, industry, governmental agency, exchange, weather, politics, and/or other information that may impact the trading strategy. The trader may transmit the instructions to the first communication node 112 which sends the instructions to second communication node using the antennae 128, 132 or by the transmission line 144. The stock exchange can then process the actions desired by the trader upon receipt of the instructions.

The system 100 may be useful for high-frequency trading, where trading strategies are carried out on computers to execute trades in fractions of a second. In high-frequency trading, a delay of mere milliseconds may cost a trader millions of dollars; therefore, the speed of transmission of trading instructions is as important as the accuracy of the data transmitted. In some embodiments, the trader may transmit preset trading instructions or conditions for executing a trade to the communication node 116, which is located within close proximity to a stock exchange, using the high latency, high bandwidth communication link 108 at a time before the trader wishes to execute a trade. These instructions or conditions may require the transmission of a large amount of data, and may be delivered more accurately using the higher bandwidth communication link 108. Also, if the instructions or conditions are sent at a time prior to when a trade is wished to be executed, the higher latency of the communication link 108 can be tolerated.

The eventual execution of the instructions may be accomplished by the trader transmitting triggering data to the system on which the instructions are stored. Upon receipt of the triggering data, the trading instructions are sent to the stock exchange and a trade is executed. The triggering data that is transmitted is generally a much smaller amount of data than the instructions; therefore, the triggering data may be sent over the low latency, low bandwidth communication link 104. When the triggering data is received at communication node 116, the instructions for (and/or news associated with) a specific trade are sent to the stock exchange. Sending the triggering data over the low latency communication link 104 rather than the high latency communication link 108 allows the desired trade to be executed as quickly as possible, giving the trader a time advantage over other parties trading the same financial instruments.

Figure 2:
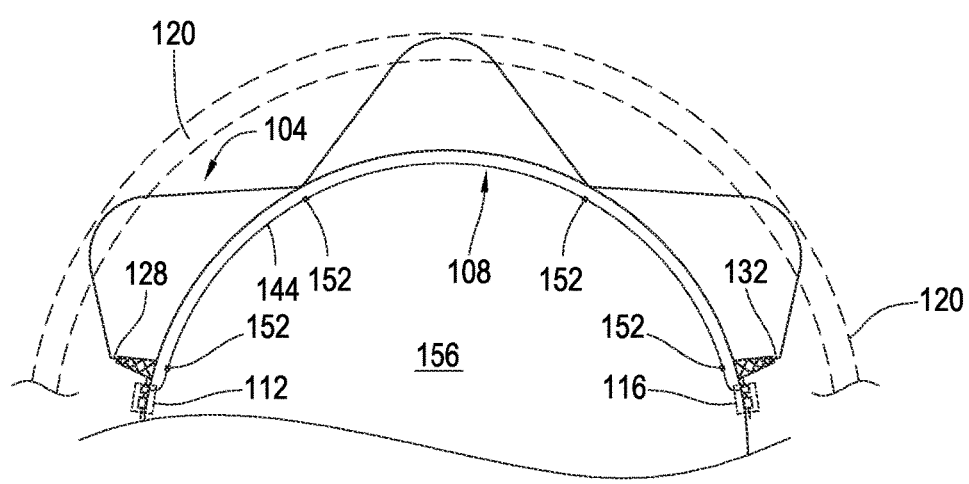
FIG. 2 is a schematic diagram further illustrating the skywave propagation of FIG. 1

The configuration shown in FIG. 1 is further illustrated in FIG. 2 where the first communication node 112 and the second communication node 116 are geographically remote from one another separated by a substantial portion of the surface of the earth (156). This portion of the earth's surface may include one or more continents, oceans, mountain ranges, or other geographic areas. For example, the distance spanned in FIGS. 1-7 may cover a single continent, multiple continents, an ocean, and the like. In one example, the first communication node 112 is in Chicago, Ill. in the United States of America, and the second communication node 116 is in London, England, in the United Kingdom. In another example, the first communication node 112 is in New York City, N.Y., and second communication node 116 is in Los Angeles, Calif., both cities being in North America. Any suitable combination of distance, communication nodes, and communications links is envisioned that can provide satisfactory latency and bandwidth.

FIG. 2 illustrates that skywave propagation allows electromagnetic energy to traverse long distances. Using skywave propagation, the low latency communication link 104 transmits the electromagnetic waves 124 into a portion of the atmosphere 120 that is sufficiently ionized to refract the electromagnetic waves 124 toward the earth. The waves may then be reflected by the surface of the earth and returned to the ionized portion of the upper atmosphere 120 where they may be refracted toward earth again. Thus electromagnetic energy may "skip" repeatedly allowing the low latency, low bandwidth signals 124 to cover distances substantially greater than those which may be covered by non-skywave propagation.

Figure 3:
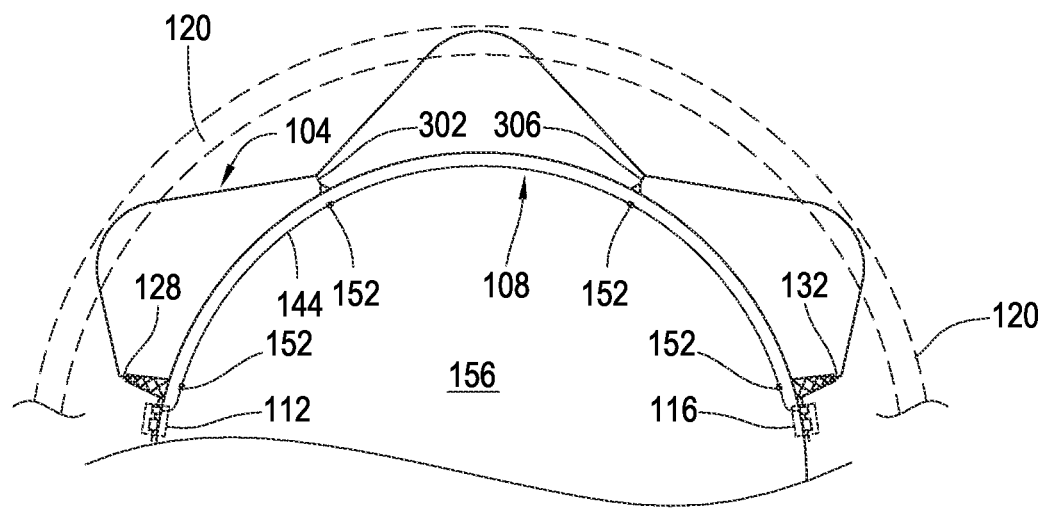
FIG. 3 is a schematic diagram illustrating the use of ground-based repeaters in the skywave propagation of FIG. 1.

Another example of the system illustrated in FIG. 1 appears in FIG. 3 where the skywave propagation discussed with respect to FIGS. 1 and 2 may be enhanced using repeaters 302 and 306. In this example, the first repeater 302 may receive the low latency communication signals emanating from the antenna 128. The signals may be refracted by the ionized region 120 and returned to earth where they may be received by the repeater 302 and retransmitted via skywave propagation. The refracted signal may be received by the repeater 306 and retransmitted using skywave propagation to the second communications node 116 via the antenna 132. Although two repeating stations are illustrated in FIG. 3, any suitable number, configuration, or positioning of the ground repeating stations 302 is considered. Increasing the number of repeaters 302, 306 may provide for the opportunity to transmit low latency signals over greater distances in a wider array of atmospheric missions, however, the physical limitations of the repeater circuitry that receives and retransmits the signal may add additional latency to low latency communication link 104.

Figure 4:
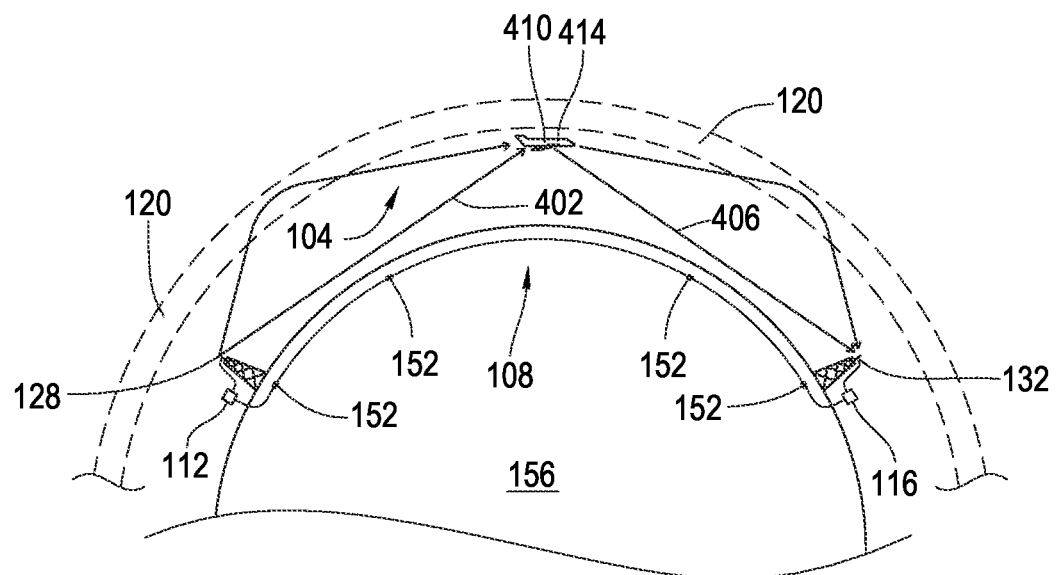
FIG. 4 is a schematic diagram illustrating the use of airborne repeaters in the skywave propagation of FIG. 1.

FIG. 4 illustrates another example of the system illustrated in FIG. 1 where one or more repeaters along the first communications link are airborne, such as in an aircraft, dirigible, balloon, or other device 410 configured to maintain the repeater aloft in the atmosphere. In this example, signals transmitted from the first communications node 112 via the antenna 128 may be received by an airborne repeater 414 either as line of sight communication 402, or by skywave propagation as described herein elsewhere. The signals may be received by the airborne repeater 414 and retransmitted as line of sight communication 406, or by skywave propagation to the second communications node 116 along the low latency link 104.

Figure 5:
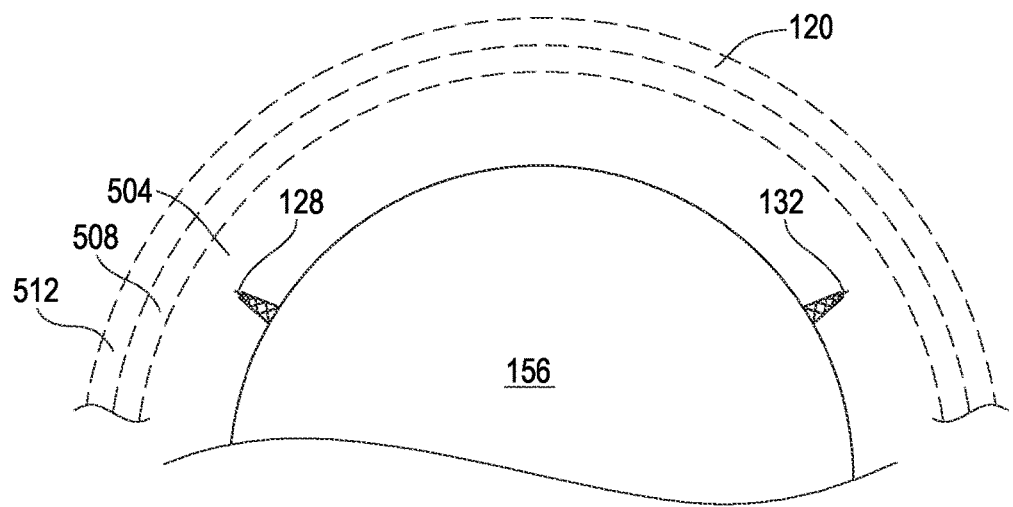
FIG. 5 is a schematic diagram illustrating additional layers of the atmosphere including the ionized layer shown in FIG. 1.
Figure 6:
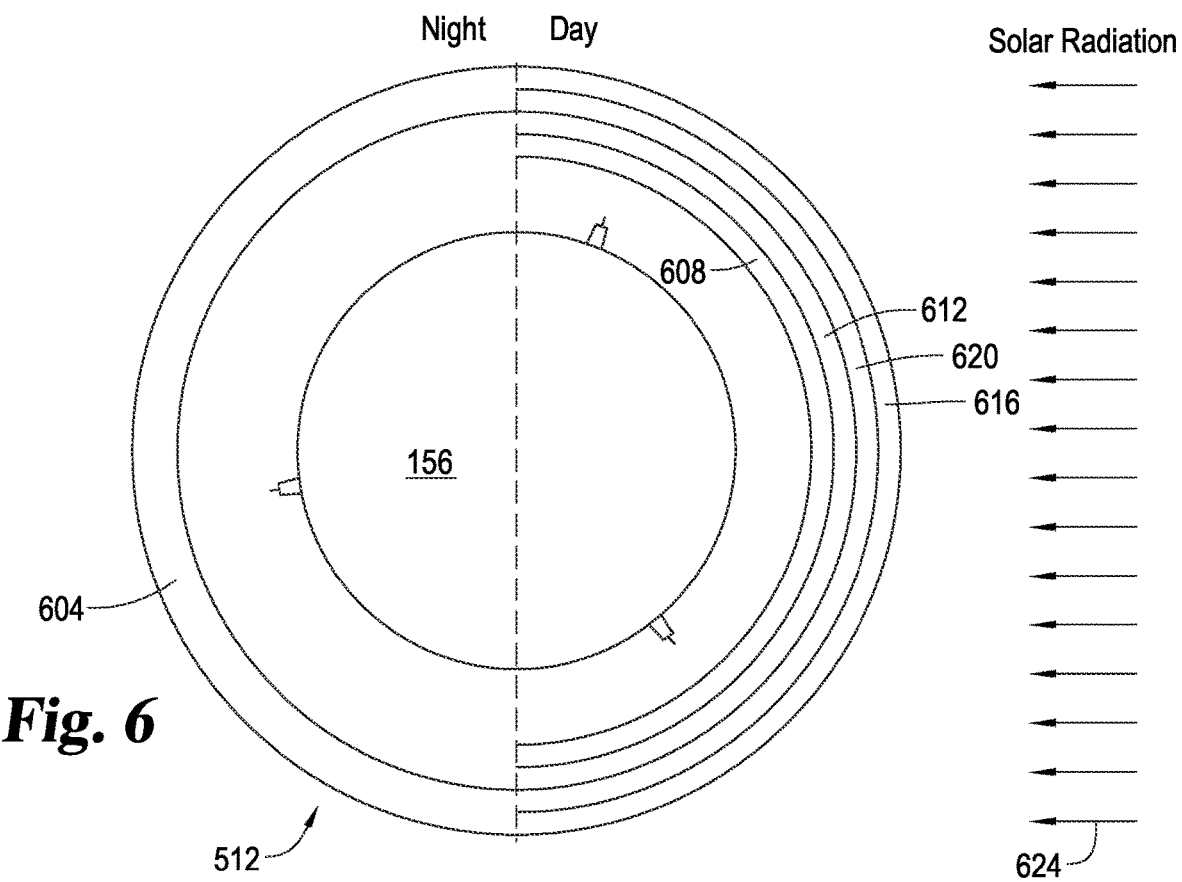
FIG. 6 is a schematic diagram illustrating various ionized layers of the atmosphere shown in FIG. 5.
Figure 7:
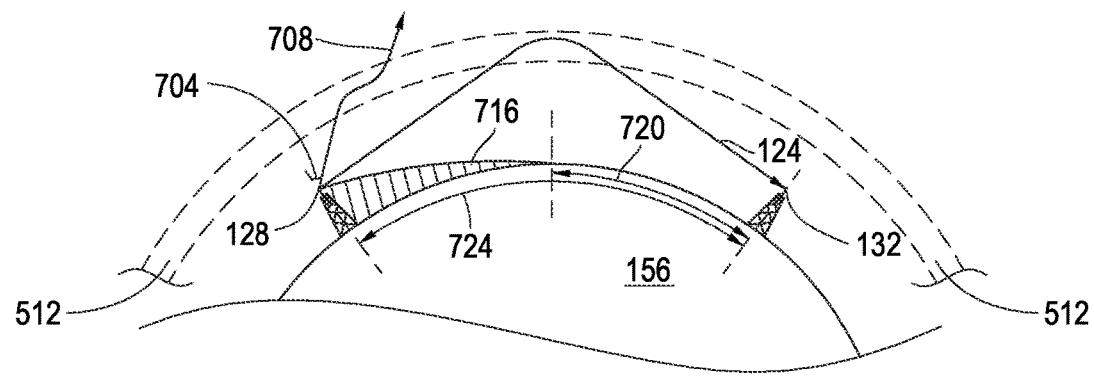
FIG. 7 is a schematic diagram illustrating additional details of skywave propagation generally illustrated in FIGS. 1-6.

Additional details regarding skywave propagation are illustrated in FIGS. 5-7. The relation to the system disclosed and various layers of the upper atmosphere is illustrated in FIG. 5. For purposes of radio transmission, the layers of the upper atmosphere may be divided as shown into successively higher layers such as the troposphere 504, the stratosphere 508, and the ionosphere 512.

The ionosphere is named as such because it includes a high concentration of ionized particles. The density of these particles in the ionosphere furthest from earth is very low and becomes progressively higher in the areas of the ionosphere closer to earth. The upper region of the ionosphere is energized by powerful electromagnetic radiation from the sun which includes high-energy ultraviolet radiation. This solar radiation causes ionization of the air into free electrons, positive ions, and negative ions. Even though the density of the air molecules in the upper ionosphere is low, the radiation particles from space are of such high energy that they cause extensive ionization of the relatively few air molecules that are present. The ionization extends down through the ionosphere with diminishing intensity as air becomes denser with the highest degree of ionization thus occurring at the upper extremities of the ionosphere, while the lowest degree occurs in the lower portion of the ionosphere.

These differences in ionization between the upper and lower extremities of the ionosphere 512 are further illustrated in FIG. 6. The ionosphere is illustrated in FIG. 6 with three layers designated, respectively, from lowest level to highest level as D layer 608, E layer 612, and F layer 604. The F layer 604 may be further divided into two layers designated F1 (the higher layer) at 616 and F2 (the lower layer) at 620. The presence or absence of layers 616 and 620 in the ionosphere and their height above the earth vary with the position of the sun. At high noon, radiation from the sun 624 passing into the ionosphere is greatest, tapering off at sunset and at a minimum at night. When the radiation is removed, many of the ions recombine causing the D layer 608 and the E layer 612 to disappear, and further causing the F1 and F2 layers 616, 620 to recombine into a single F layer 604 during the night. Since the position of the sun varies with respect to a given point on earth, the exact characteristics of the layers 608, 612, 616, and 620 of the ionosphere 512 can be extremely difficult to predict but may be determined by experimentation.

The ability for a radio wave to reach a remote location using skywave propagation depends on various factors such as ion density in the layers 608-620 (when they are present), the frequency of the transmitted electromagnetic energy, and the angle of transmission. For example, if the frequency of a radio wave is gradually increased, a point will be reached where the wave cannot be refracted by the D layer 608 which is the least ionized layer of the ionosphere 512. The wave may continue through the D layer 608 and into the E layer 612 where its frequency may still be too great to refract the singles passing through this layer as well. The waves 124 may continue to the F2 layer 620 and possibly into the F1 layer 616 as well before they are bent toward earth. In some cases, the frequency may be above a critical frequency making it impossible for any refraction to occur causing the electromagnetic energy to be radiated out of the earth's atmosphere (708).

Thus, above a certain frequency, electromagnetic energy transmitted vertically continues into space and is not refracted by the ionosphere 512. However, some waves below the critical frequency may be refracted if the angle of propagation 704 is lowered from the vertical. Lowering the angle of propagation 704 also allows the electromagnetic waves 124 transmitted by the antenna 128 to be refracted toward Earth's surface within a skip zone 720 making it possible to traverse a skip distance 724 and reach a remote antenna 132. Thus the opportunity for successful skywave propagation over a certain skip distance 724 is further dependent on the angle of transmission as well as the frequency, and therefore the maximum usable frequency varies with the condition of the ionosphere, desired skip distance 724, and the propagation angle 704. FIG. 7 also illustrates that non-skywave propagation such as groundwave signals and/or line of sight signals 716 are unlikely to traverse the skip distance 724.

Figure 8:
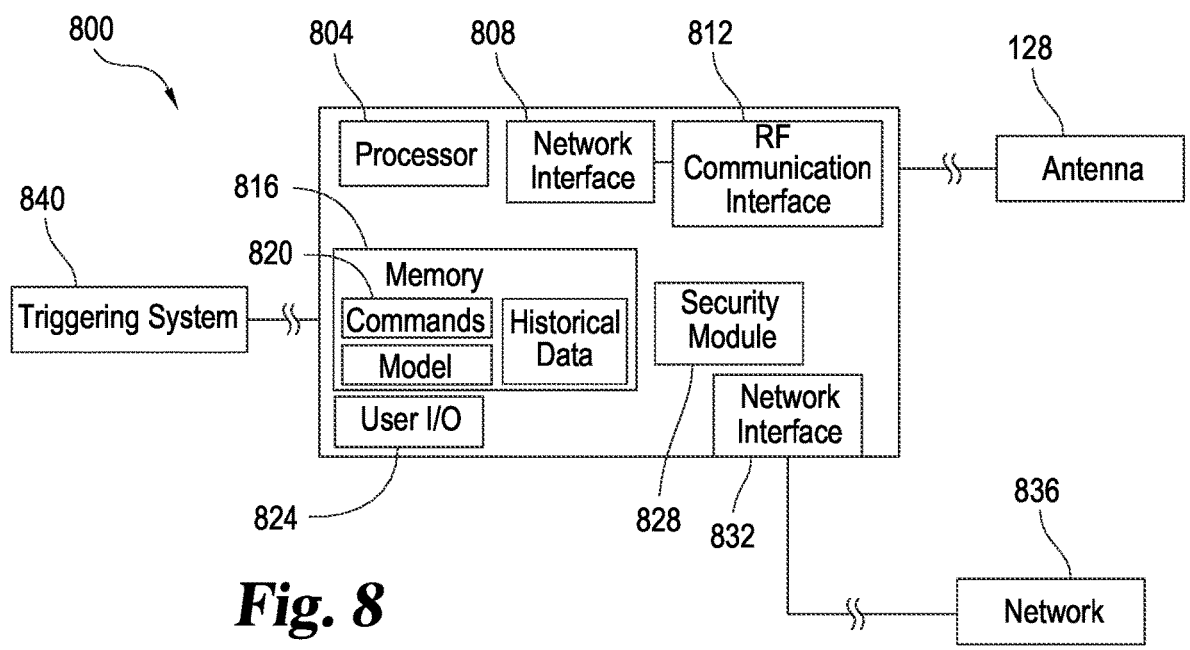
FIG. 8 is a schematic diagram illustrating additional detail for the communication nodes of FIG. 1.

FIG. 8 illustrates one example of additional aspects of a communication node 800 which is like the communication nodes 112 and 116. The communication node 800 can include a processor 804 for controlling various aspects of communication node 800. The processor may be coupled to a memory 816 useful for storing rules, command data 820, historical transmission data 822, and/or a transmission frequency model 860. Devices for accepting user input and providing output (I/O) to a user 824 may also be included. These devices may include a keyboard or keypad, a mouse, a display such as a flat panel monitor and the like, a printer, plotter, or 3D printer, a camera, or a microphone. Any suitable devices for user I/O may be included. Node 800 may also include a network interface 832 responsive to the processor 804 and coupled to a communication network 836. A security module 828 may be included as well and may be used to reduce or eliminate the opportunity for third-parties to intercept, jam, or change data as it passes between the communications nodes 800. In one example, the communication node 800 is implemented as a computer executing software to control the interaction of the various aspects of the node 800.

The network interface 836 may be configured to send and receive data such as command data 820, or triggering data which may be passed from a triggering system 840. The communication network 836 may be coupled to a network such as the internet and configured to send and receive data without the use of skywave propagation. For example, the communication network 836 may transmit and receive data over optical fibers or other transmission lines running along the earth similar to the transmission lines 144 illustrated in previous figures.

The node 800 may include a second network interface 808 responsive to the processor 804 and coupled to a radio-frequency communication interface 812. This second network interface 808 may be used to transfer data such as command data 820 or triggering data passed from the triggering system 840. The network interface 808 may be coupled to an antenna like antenna 128 which may include multiple antennas or antenna elements. The radio-frequency communication interface 812 may be configured to send and receive data such as triggering data using electromagnetic waves transmitted and/or received via the antenna 128. As discussed above, the antenna 128 may be configured to send and receive the electromagnetic waves via skywave propagation.

Figure 9:
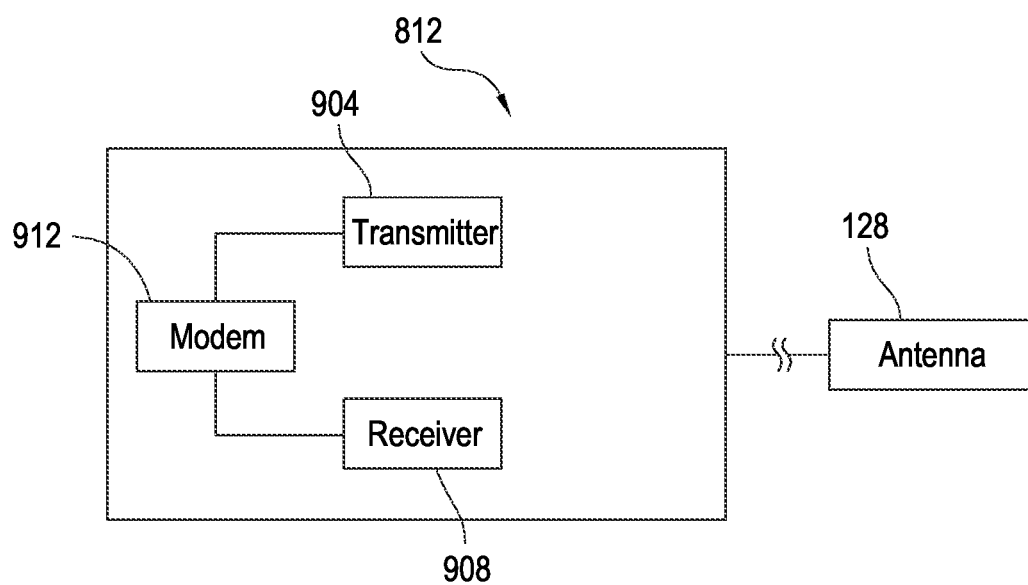
FIG. 9 is a schematic diagram illustrating additional detail for the RF communication interface in FIG. 8.

The communication node 800 may include additional aspects illustrated in FIG. 9. The radio-frequency communication interface 812 may include a transmitter 904 configured to transmit electromagnetic energy using the antenna 128. A receiver 908 may optionally be included as well and configured to receive electromagnetic waves from the antenna 128. The transmitter 904 and the receiver 908 may also be coupled to a modem 912 configured to modulate signals received by the interface 812 to encode information or data from a digital stream for transmission by transmitter 904. The modem 912 may also be configured to demodulate signals received by the receiver 908 from the antenna 128 to decode the transmitted signal into a digital data stream usable by the processor 804 or that may be stored in the memory 816.

Transmission by skywave propagation may cause distortion of the transmitted data transmission due to ionospheric and atmospheric conditions. This distortion or the introduction of noise during skywave propagation may cause the received signal to be inaccurate or could increase the latency time of data transmission as the receiver attempts to unscramble the received data signal. If the distortion effects of the atmosphere are known, it may be possible to precondition a transmitted data signal so that the distortion caused by the atmosphere effectively gets rid of the added distortions and unscrambles and removes noise from the transmitted data signal. Therefore, when the data signal is received at the receiver, a substantially undistorted signal is received, saving time in decoding the signal and providing a more accurate signal.

Figure 10:
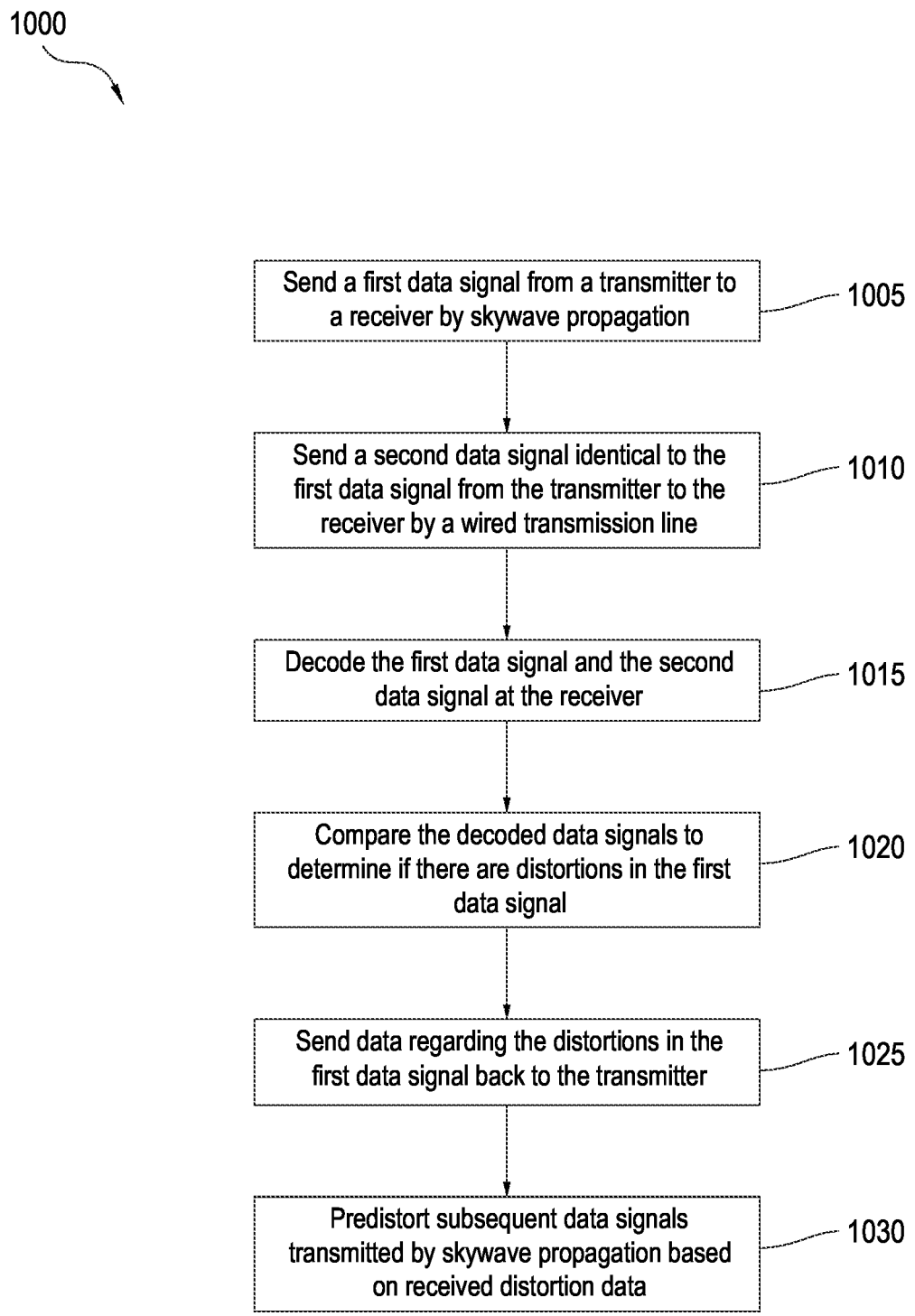
FIG. 10 is a flowchart illustrating a method for preconditioning a data signal.
Figure 11:
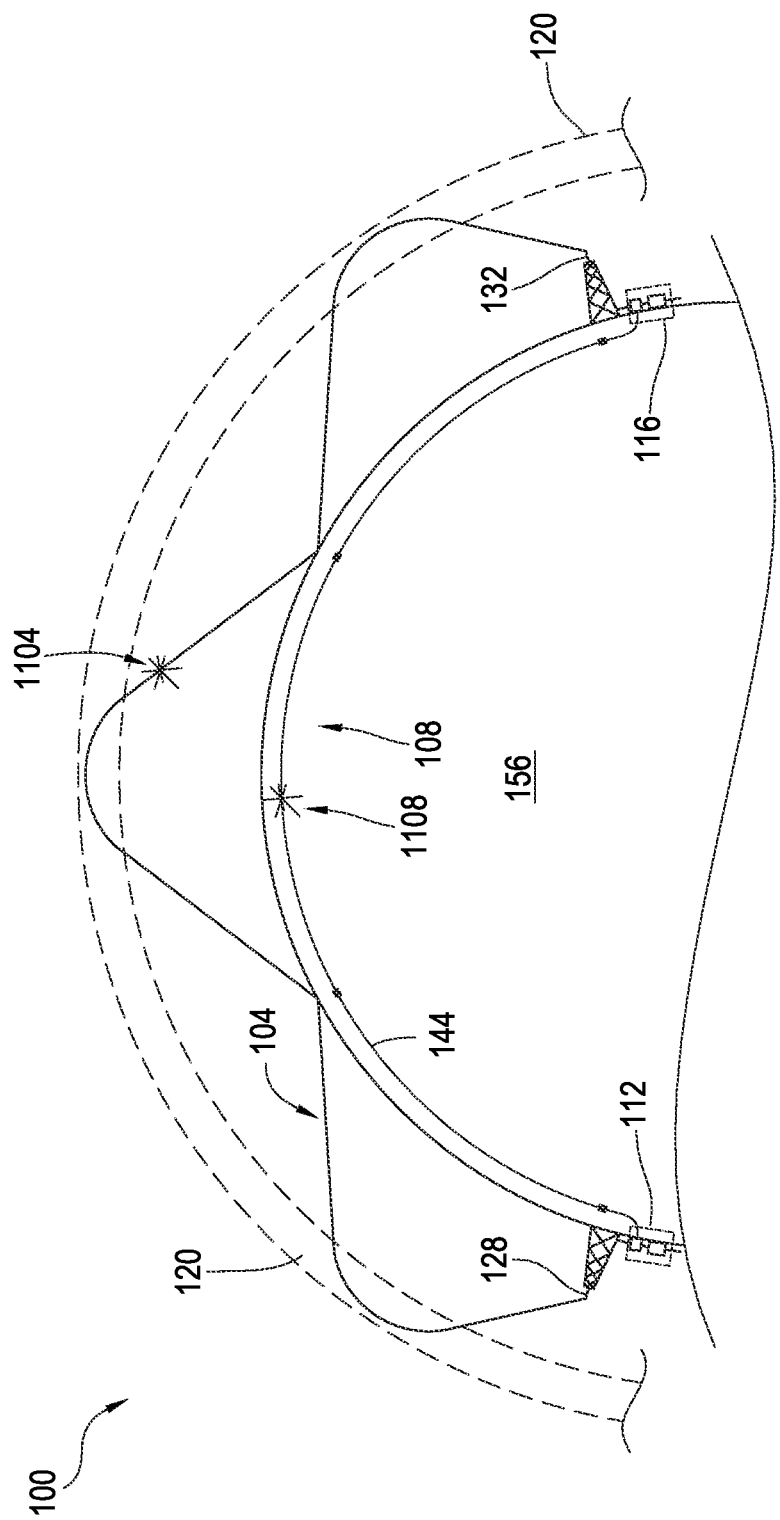
FIG. 11 is a schematic diagram further illustrating a system for transmitting data over separate communication links.

A method for preconditioning a data signal is shown in flowchart 1000, illustrated in FIG. 10. A first data signal 1104 (see FIG. 11) is sent 1005 from a transmitter, such as the first communication node 112, to a receiver, such as the second communication node 116, by skywave propagation. An example of a data transmission path for the first data signal 1104 is the low-latency, low bandwidth communication link 104. A second data signal 1108 that is identical to the first data signal 1104 is also sent 1010 from the transmitter to the receiver, but using a different data transmission path that does not use skywave propagation. One example of a possible data transmission path is the high-latency, high bandwidth communication link 108 that is formed by the transmission line 144 extending between the first communication node 112 and the second communication node 116.

The first data signal 1104 and the second data signal 1108 are decoded 1015 after they are received at the receiver. The decoded signals are compared 1020 to determine any differences between the received first data signal 1104 and the received second data signal 1108. Because the first data signal 1104 and the second data signal 1108 were identical at transmission, any differences between the data signals at the receiver may indicate distortion caused in the first data signal due to ionospheric or other atmospheric conditions during skywave propagation. These distortions caused by skywave propagation will not appear in the second data signal 1108 because the second data signal 1108 was sent by the transmission line 144.

Data regarding the distortion of the first data signal 1104 is sent 1025 back to the original transmitter. In some embodiments, the distortion data may be sent back to the transmitter using the high-latency, high-bandwidth communication link 108, but in other embodiments, the distortion data may be returned to the transmitter using skywave propagation. After receiving the distortion data, the transmitter may precondition 1030 subsequent data signals to be transmitted by skywave propagation based on the distortion data.

Figure 12:
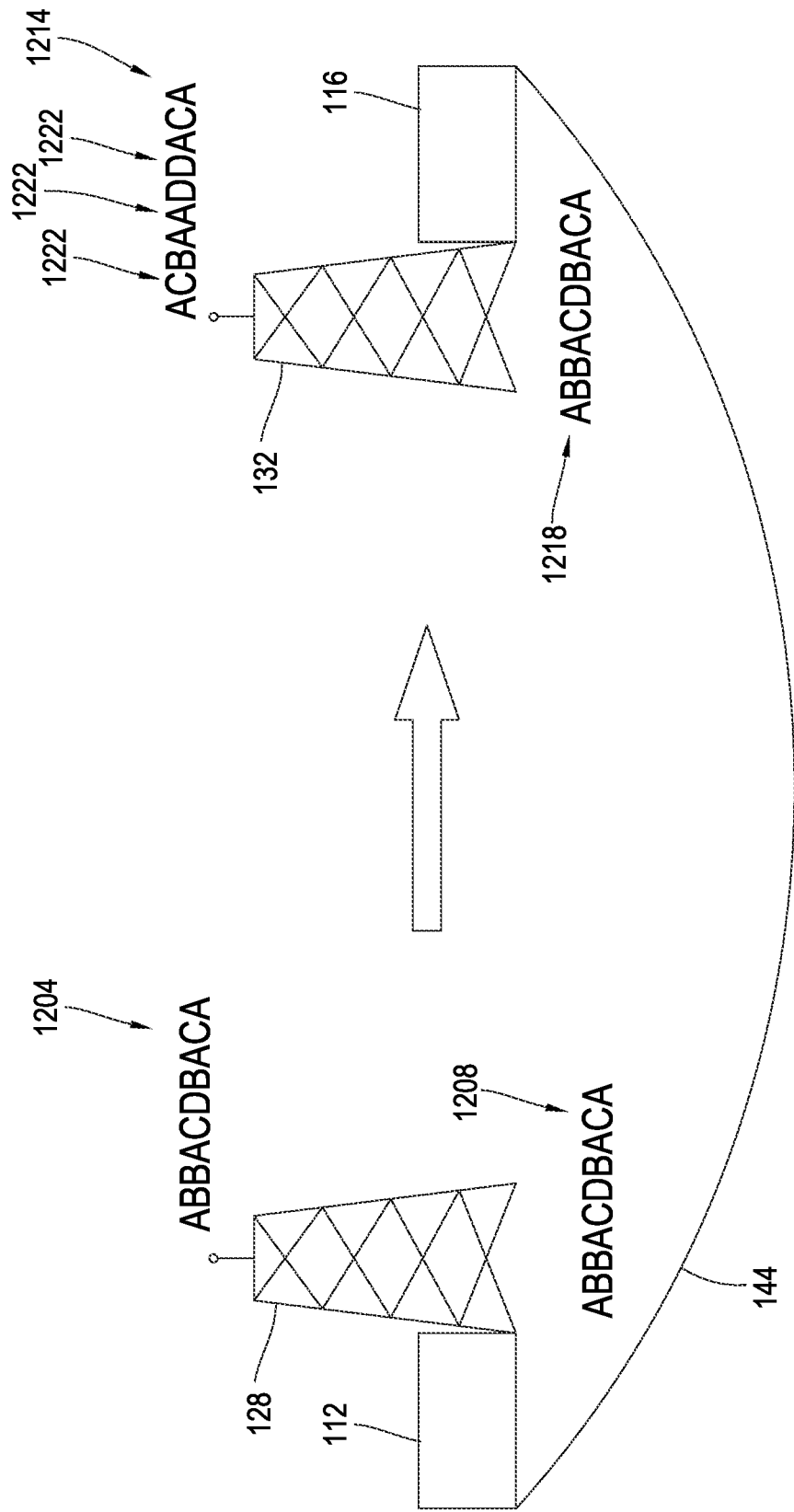
FIG. 12 is a schematic diagram illustrating distortion caused by skywave propagation.
Figure 13:
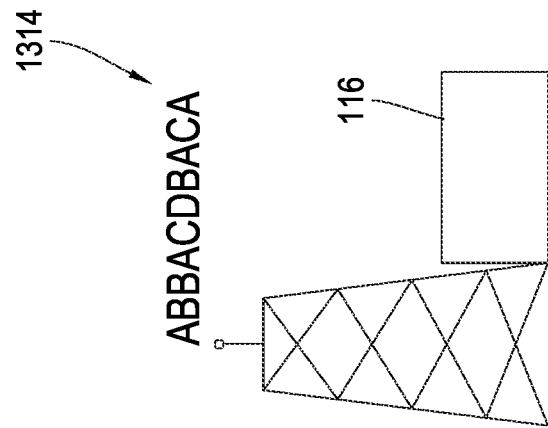
FIG. 13 is a schematic diagram illustrating sending a preconditioned data signal by skywave propagation.
Figure 13:
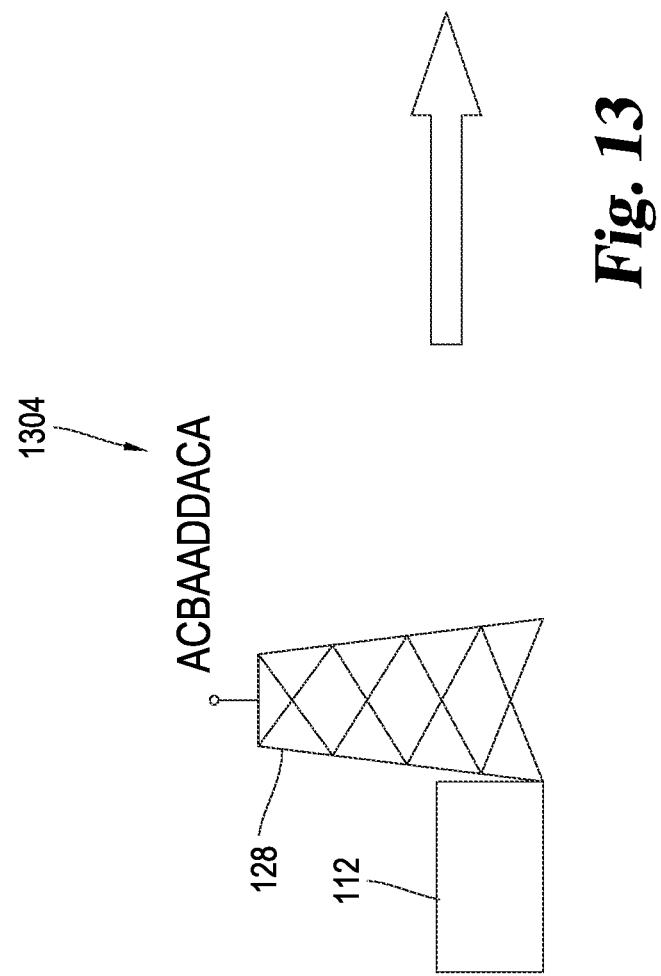

An example of how preconditioning may be used to reduce latency and improve accuracy of a transmitted data signal is shown in FIGS. 12-13. In FIG. 12, a first transmitted data signal 1204 is sent between communication nodes 112 and 116 using antennae 128, 132 by skywave propagation. A second transmitted data signal 1208, identical to the first transmitted data signal 1204, is sent between the communication nodes 112, 116 by the transmission line 144. The first transmitted data signal 1204 is received at the communication node 116 as a first received data signal 1214. The first received data signal 1214 has experienced distortion due to skywave propagation as several portions 1222 of the received data signal 1214 are different than the transmitted data signal 1204. Meanwhile, the second received data signal 1218 has not experienced the distortion that is seen in first received data signal 1214 because it was not sent by skywave propagation.

The second communication node 116 may be compared to the first received data signal 1214 and the second received data signal 1218 to determine where distortion has occurred. This distortion data may then be sent back to the first communication node 112 either by the transmission line 144 or by skywave propagation from the antenna 132 to antenna 128. A future transmission of a transmitted data signal may then be preconditioned so that distortions caused by the atmosphere in skywave propagation modify the transmitted data signal so that it is changed to the desired signal with minimum distortion or completely without distortions.

FIG. 13 shows an example where a data signal identical to the first transmitted data signal 1204 is desired to be sent from the first communication node 112 to the second communication node 116. As shown, the transmitted data signal 1304 is not the same as the desired first transmitted data signal 1204, but instead has already been distorted based on the observed distortions found in the first received data signal 1214. When the transmitted data signal 1304 is sent by skywave propagation, the transmitted data signal 1304 is distorted by the atmosphere so that the preconditioned portions of transmitted data signal 1304 are changed in a received data signal 1314 to correspond with the desired data signal. Therefore, when the data signal 1314 is received at the second communication node 116, the data signal 1314 includes only limited distortions or includes no distortions. Limiting distortion of the received data signal 1314 reduces latency by decreasing the processing time at the second communication node 116 necessary for unscrambling or removing noise from the signal.

Figure 14:
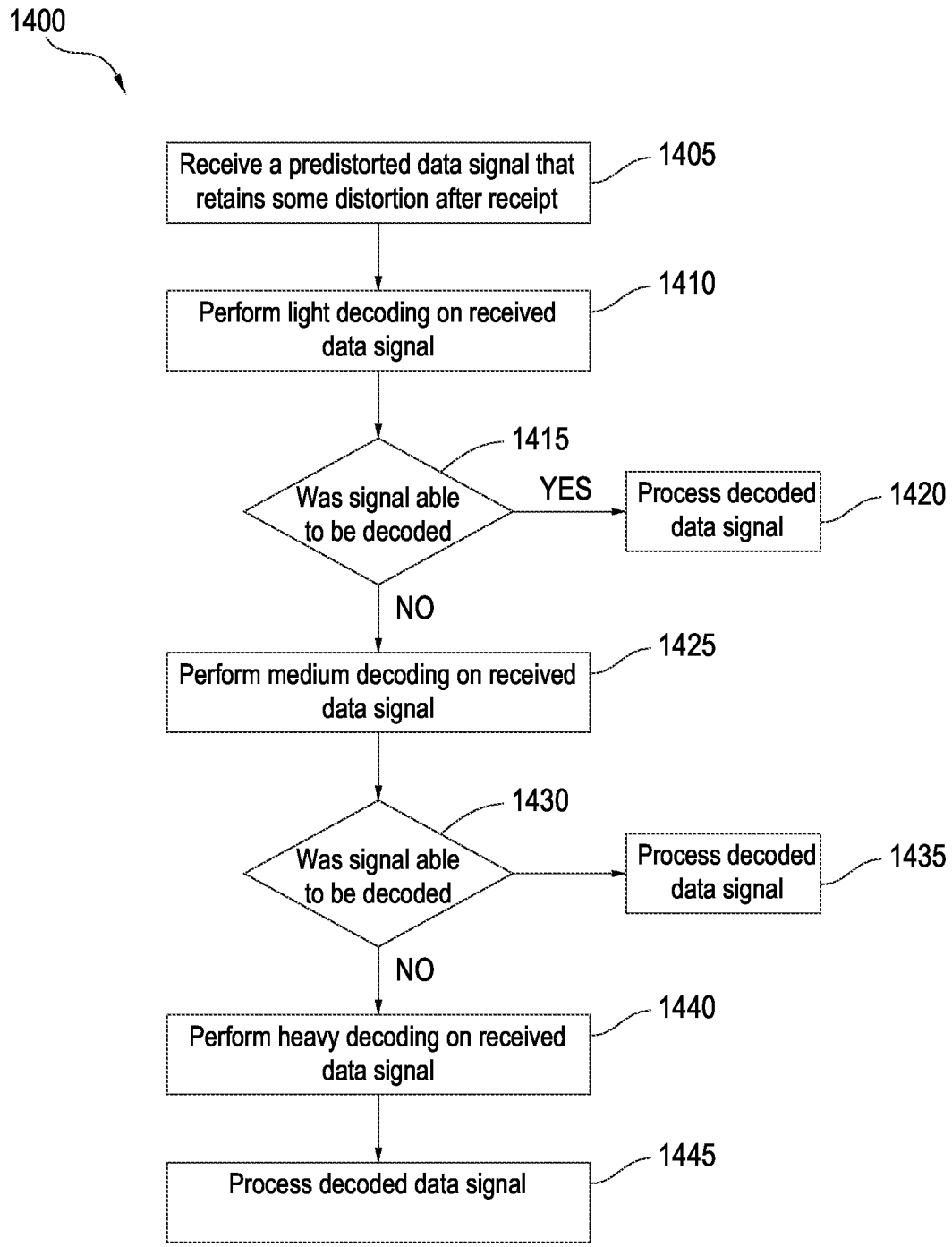
FIG. 14 is a flowchart illustrating a method of decoding a data signal.

In some embodiments, preconditioning may not result in a completely undistorted data signal received by the receiver and some additional distortion of the signal may still remain upon receipt of the signal. The flowchart 1400 shown in FIG. 14 illustrates a method of further decoding a signal in which preconditioning does not provide adequate descrambling. First, a preconditioned data signal that still contains some distortion after transmission is received 1405 at a receiver. The receiver performs 1410 a light decoding method to attempt to descramble the distorted data signal. Generally, the light decoding method includes a form of decoding that is computationally inexpensive and has a short processing time, allowing the data signal to be transmitted more quickly. If the data signal is able to be decoded 1415, then the data signal is processed 1420 and any instructions or actions carried by the data signal are executed.

If the data signal is not able to be descrambled by the light decoding, then a medium decoding process is performed 1425 on the received data signal. The medium decoding process is generally a more intensive decoding method than the light decoding method and typically takes a longer time to perform. If the medium decoding method is successful in descrambling the data signal 1430, then the data signal is processed 1435 and any instructions or actions carried by the data signal are executed. If the data signal is not able to be descrambled by the medium decoding process, then heavy decoding is performed 1440 on the received data signal. The heavy decoding method is the most computationally expensive of the decoding processes and generally takes longer than the light or medium decoding processes to complete. Once the data signal has been decoded by the heavy decoding process, the data signal is processed 1445 and any instructions or actions carried by the data signal are executed.

Figure 15:
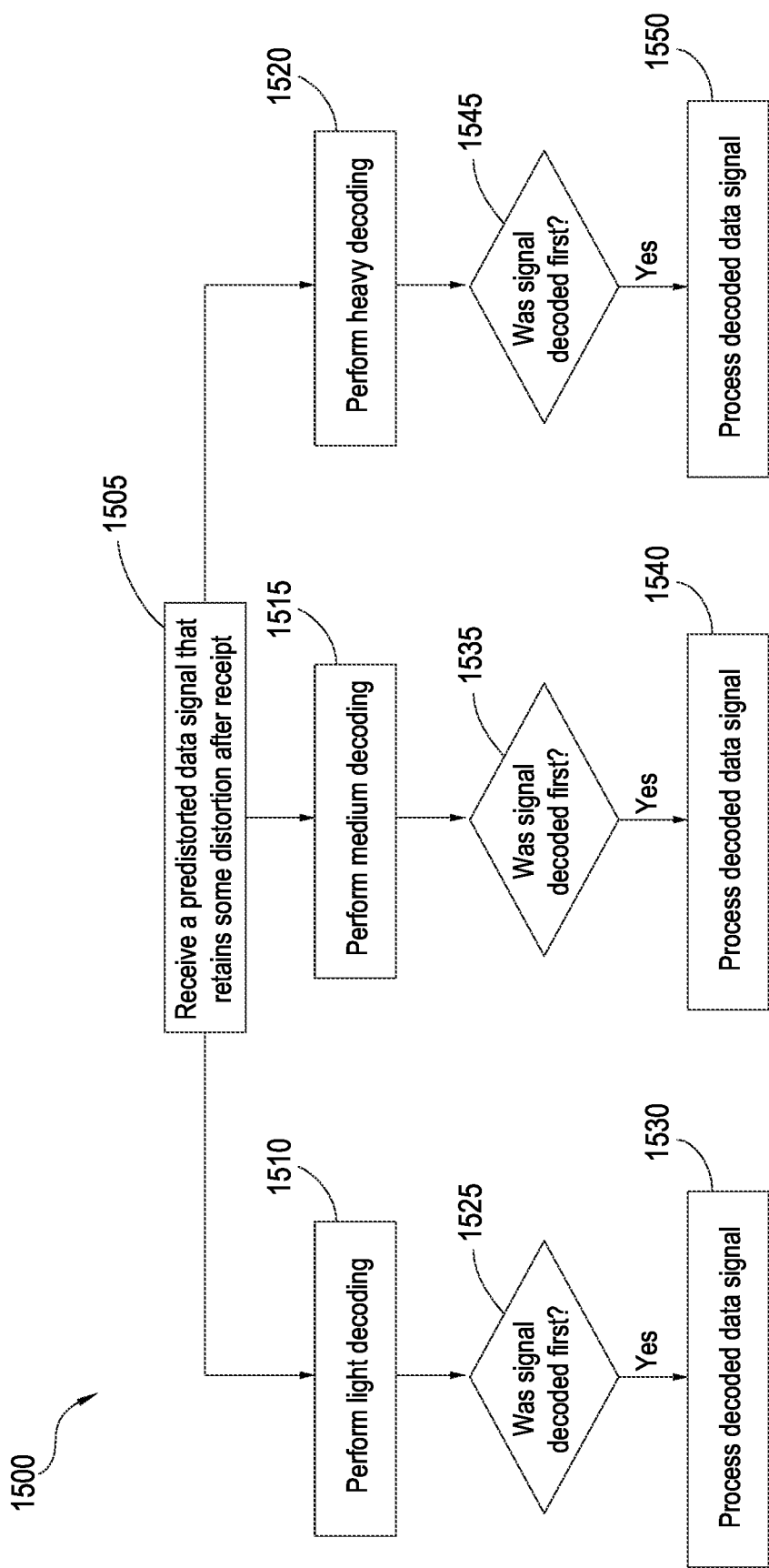
FIG. 15 is a flowchart illustrating a method of decoding and processing a data signal.

An alternative method of decoding a preconditioned data signal that has been transmitted by skywave propagation is shown in the flowchart 1500 of FIG. 15. A preconditioned data signal that retains some distortion after transmission is received 1505 at a receiver. A processor at the receiver then attempts to decode the transmission by running three different decoding programs in parallel. The processor performs 1510 a light decoding method while also performing 1515 a medium decoding method and performing 1520 a heavy decoding method. When the light decoding method is complete, the processor determines 1525 whether this method decoded the signal before the medium and heavy decoding methods.

If the light decoding method is completed first, then the data signal from the light decoding method is processed 1530 and any instructions or actions carried by the data signal are executed. This process is repeated for each of the other decoding methods. When the medium decoding method is complete, the processor determines 1535 whether this method decoded the signal before the light and heavy decoding methods. If the medium decoding method is completed first, then the data signal from the medium decoding method is processed 1430 and any instructions or actions carried by the data signal are executed. Likewise, when the heavy decoding method is complete, the processor determines 1545 whether this method decoded the signal before the light and medium decoding methods. If the heavy decoding method is completed first, then the data signal from the heavy decoding method is processed 1550 and any instructions or actions carried by the data signal are executed.

Typically, the light decoding method has the quickest processing time. However, in some instances, the light decoding method may not be rigorous enough to decode the received data signal or some characteristics of the data signal may be more quickly decoded by either the medium or heavy decoding methods despite the added computational expense. The parallel method of decoding the data signal shown in FIG. 15 allows for the decoding method with the quickest processing time to be used in order to decrease latency and to use the transmitted data signal more quickly.

In some embodiments, preconditioning may be used in the transmission of news and/or financial trading instructions from a financial trader to a stock exchange for high frequency trading. Because one of the main concerns in high-frequency trading is timing and submitting instructions as quickly as possible, the reduced processing time and low-latency of preconditioned signals may afford advantages that could be worth millions of dollars. In a certain embodiment, a financial trader may submit multiple variations of data signals containing trading instructions that are to be transmitted to a stock exchange. The different variations may correspond to a particular trading strategy that may or may not be implemented. Each variation of the data signal may be preconditioned by a processor connected to the transmitter. The trader may pick which trading strategy to implement, and the data signal variation corresponding to that strategy is immediately sent to a receiver at the stock exchange to execute the trade. Alternatively or additionally, private or public news can be transmitted from the trade or some other source to initiate a particular trading strategy.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

Glossary of Definitions and Alternatives

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's and Random House dictionaries. As used in the specification and claims, the following definitions apply to the following terms or common variations thereof (e.g., singular/plural forms, past/present tenses, etc.):

"Antenna" or "Antenna system" generally refers to an electrical device, or series of devices, in any suitable configuration, that converts electric power into electromagnetic radiation. Such radiation may be either vertically, horizontally, or circularly polarized at any frequency along the electromagnetic spectrum. Antennas transmitting with circular polarity may have either right-handed or left-handed polarization.

In the case of radio waves, an antenna may transmit at frequencies ranging along electromagnetic spectrum from extremely low frequency (ELF) to extremely high frequency (EHF). An antenna or antenna system designed to transmit radio waves may comprise an arrangement of metallic conductors (elements), electrically connected (often through a transmission line) to a receiver or transmitter. An oscillating current of electrons forced through the antenna by a transmitter can create an oscillating magnetic field around the antenna elements, while the charge of the electrons also creates an oscillating electric field along the elements. These time-varying fields radiate away from the antenna into space as a moving transverse electromagnetic field wave. Conversely, during reception, the oscillating electric and magnetic fields of an incoming electromagnetic wave exert force on the electrons in the antenna elements, causing them to move back and forth, creating oscillating currents in the antenna. These currents can then be detected by receivers and processed to retrieve digital or analog signals or data.

Antennas can be designed to transmit and receive radio waves substantially equally in all horizontal directions (omnidirectional antennas), or preferentially in a particular direction (directional or high gain antennas). In the latter case, an antenna may also include additional elements or surfaces which may or may not have any physical electrical connection to the transmitter or receiver. For example, parasitic elements, parabolic reflectors or horns, and other such non-energized elements serve to direct the radio waves into a beam or other desired radiation pattern. Thus antennas may be configured to exhibit increased or decreased directionality or "gain" by the placement of these various surfaces or elements. High gain antennas can be configured to direct a substantially large portion of the radiated electromagnetic energy in a given direction that may be vertical horizontal or any combination thereof.

Antennas may also be configured to radiate electromagnetic energy within a specific range of vertical angles (i.e. "takeoff" angles) relative to the earth in order to focus electromagnetic energy toward an upper layer of the atmosphere such as the ionosphere. By directing electromagnetic energy toward the upper atmosphere at a specific angle, specific skip distances may be achieved at particular times of day by transmitting electromagnetic energy at particular frequencies.

Other examples of antennas include emitters and sensors that convert electrical energy into pulses of electromagnetic energy in the visible or invisible light portion of the electromagnetic spectrum. Examples include light emitting diodes, lasers, and the like that are configured to generate electromagnetic energy at frequencies ranging along the electromagnetic spectrum from far infrared to extreme ultraviolet.

"Command" or "Command Data" generally refers to one or more directives, instructions, algorithms, or rules controlling a machine to take one or more actions, alone or in combination. A command may be stored, transferred, transmitted, or otherwise processed in any suitable manner. For example, a command may be stored in a memory or transmitted over a communication network as electromagnetic radiation at any suitable frequency passing through any suitable medium.

"Computer" generally refers to any computing device configured to compute a result from any number of input values or variables. A computer may include a processor for performing calculations to process input or output. A computer may include a memory for storing values to be processed by the processor, or for storing the results of previous processing.

A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network interface to perform various network communications upon request. The network interface may be part of the computer, or characterized as separate and remote from the computer.

A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. The communication network connected to the computer may also be connected to a wider network such as the internet. Thus computer may include one or more physical processors or other computing devices or circuitry, and may also include any suitable type of memory.

A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer.

The concept of "computer" and "processor" within a computer or computing device also encompasses any such processor or computing device serving to make calculations or comparisons as part of disclosed system. Processing operations related to threshold comparisons, rules comparisons, calculations, and the like occurring in a computer may occur, for example, on separate servers, the same server with separate processors, or on a virtual computing environment having an unknown number of physical processors as described above.

A computer may be optionally coupled to one or more visual displays and/or may include an integrated visual display. Likewise, displays may be of the same type, or a heterogeneous combination of different visual devices. A computer may also include one or more operator input devices such as a keyboard, mouse, touch screen, laser or infrared pointing device, or gyroscopic pointing device to name just a few representative examples. Also, besides a display, one or more other output devices may be included such as a printer, plotter, industrial manufacturing machine, 3D printer, and the like. As such, various display, input and output device arrangements are possible.

Multiple computers or computing devices may be configured to communicate with one another or with other devices over wired or wireless communication links to form a communication network. Network communications may pass through various computers operating as network appliances such as switches, routers, firewalls or other network devices or interfaces before passing over other larger computer networks such as the internet. Communications can also be passed over the communication network as wireless data transmissions carried over electromagnetic waves through transmission lines or free space. Such communications include using WiFi or other Wireless Local Area Network (WLAN) or a cellular transmitter/receiver to transfer data. Such signals conform to any of a number of wireless or mobile telecommunications technology standards such as 802.11a/b/g/n, 3G, 4G, and the like.

"Communication Link" generally refers to a connection between two or more communicating entities and may or may not include a communications channel between the communicating entities. The communication between the communicating entities may occur by any suitable means. For example the connection may be implemented as an actual physical link, an electrical link, an electromagnetic link, a logical link, or any other suitable linkage facilitating communication.

In the case of an actual physical link, communication may occur by multiple components in the communication link figured to respond to one another by physical movement of one element in relation to another. In the case of an electrical link, the communication link may be composed of multiple electrical conductors electrically connected to form the communication link.

In the case of an electromagnetic link, elements the connection may be implemented by sending or receiving electromagnetic energy at any suitable frequency, thus allowing communications to pass as electromagnetic waves. These electromagnetic waves may or may not pass through a physical medium such as an optical fiber, or through free space, or any combination thereof. Electromagnetic waves may be passed at any suitable frequency including any frequency in the electromagnetic spectrum.

In the case of a logical link, the communication link may be a conceptual linkage between the sender and recipient such as a transmission station in the receiving station. Logical link may include any combination of physical, electrical, electromagnetic, or other types of communication links.

"Communication node" generally refers to a physical or logical connection point, redistribution point or endpoint along a communication link. A physical network node is generally referred to as an active electronic device attached or coupled to a communication link, either physically, logically, or electromagnetically. A physical node is capable of sending, receiving, or forwarding information over a communication link. A communication node may or may not include a computer, processor, transmitter, receiver, repeater, and/or transmission lines, or any combination thereof.

"Computational expense" generally refers to the level of computing power required to perform a particular function or calculation. A process is more computationally expensive than another process if that process requires greater computational resources to be completed. For example, a more computationally expensive program may require more memory or may require a computer to solve more equations than a less computationally expensive program.

"Critical angle" generally refers to the highest angle with respect to a vertical line extending to the center of the Earth at which an electromagnetic wave at a specific frequency can be returned to the Earth using sky-wave propagation.

"Critical Frequency" generally refers to the highest frequency that will be returned to the Earth when transmitted vertically under given ionospheric conditions using sky-wave propagation.

"Data Bandwidth" generally refers to the maximum throughput of a logical or physical communication path in a communication system. Data bandwidth is a transfer rate that can be expressed in units of data transferred per second. In a digital communications network, the units of data transferred are bits and the maximum throughput of a digital communications network is therefore generally expressed in "bits per second" or "bit/s." By extension, the terms "kilobit/s" or "Kbit/s", "Megabit/s" or "Mbit/s", and "Gigabit/s" or "Gbit/s" can also be used to express the data bandwidth of a given digital communications network. Data networks may be rated according to their data bandwidth performance characteristics according to specific metrics such as "peak bit rate", "mean bit rate", "maximum sustained bit rate", "information rate", or "physical layer useful bit rate." For example, bandwidth tests measure the maximum throughput of a computer network. The reason for this usage is that according to Hartley's Law, the maximum data rate of a physical communication link is proportional to its frequency bandwidth in hertz.

Data bandwidth may also be characterized according to the maximum transfer rate for a particular communications network. For example:

"Low Data Bandwidth" generally refers to a communications network with a maximum data transfer rate that is less than or about equal to 1,000,000 units of data per second. For example, in a digital communications network, the unit of data is a bit. Therefore low data bandwidth digital communications networks are networks with a maximum transfer rate that is less than or about equal to 1,000,000 bits per second (1 Mbits/s).

"High Data Bandwidth" generally refers to a communications network with a maximum data transfer rate that is greater than about 1,000,000 units of data per second. For example, a digital communications network with a high data bandwidth is a digital communications network with a maximum transfer rate that is greater than about 1,000,000 bits per second (1 Mbits/s).

"Electromagnet Radiation" generally refers to energy radiated by electromagnetic waves. Electromagnetic radiation is produced from other types of energy, and is converted to other types when it is destroyed. Electromagnetic radiation carries this energy as it travels moving away from its source at the speed of light (in a vacuum). Electromagnetic radiation also carries both momentum and angular momentum. These properties may all be imparted to matter with which the electromagnetic radiation interacts as it moves outwardly away from its source.

Electromagnetic radiation changes speed as it passes from one medium to another. When transitioning from one media to the next, the physical properties of the new medium can cause some or all of the radiated energy to be reflected while the remaining energy passes into the new medium. This occurs at every junction between media that electromagnetic radiation encounters as it travels.

The photon is the quantum of the electromagnetic interaction, and is the basic constituent of all forms of electromagnetic radiation. The quantum nature of light becomes more apparent at high frequencies as electromagnetic radiation behaves more like particles and less like waves as its frequency increases.

"Distortion" generally refers to the alteration of the original shape or other characteristic of something, and more specifically, to the alteration of the waveform of an information-bearing signal. Distortions can include, but are not limited to, amplitude, harmonic, frequency, phase, polarization, and group delay type distortions. Distortions can include linear, nonlinear, systematic, and/or random changes to the information-bearing signal. Distortions can include changes to analog and/or digital signals.

"Electromagnetic Spectrum" generally refers to the range of all possible frequencies of electromagnetic radiation. The electromagnetic spectrum is generally categorized as follows, in order of increasing frequency and energy and decreasing wavelength:

"Extremely low frequency" (ELF) generally designates a band of frequencies from about 3 to about 30 Hz with wavelengths from about 100,000 to 10,000 km long.

"Super low frequency" (SLF) generally designates a band of frequencies generally ranging between about 30 Hz to about 300 Hz with wavelengths of about 10,000 to about 1000 km long.

"Voice frequency" or "voice band" generally designates electromagnetic energy that is audible to the human ear. Adult males generally speak in the range between about 85 and about 180 Hz while adult females generally converse in the range from about 165 to about 255 Hz.

"Very low frequency" (VLF) generally designates the band of frequencies from about 3 kHz to about 30 kHz with corresponding wavelengths from about 10 to about 100 km long.

"Low-frequency" (LF) generally designates the band of frequencies in the range of about 30 kHz to about 300 kHz with wavelengths range from about 1 to about 10 km.

"Medium frequency" (MF) generally designates the band of frequencies from about 300 kHz to about 3 MHz with wavelengths from about 1000 to about 100 m long.

"High frequency" (HF) generally designates the band of frequencies from about 3 MHz to about 30 MHz having wavelengths from about 100 m to about 10 m long.

"Very high frequency" (VHF) generally designates the band of frequencies from about 30 Hz to about 300 MHz with wavelengths from about 10 m to about 1 m long.

"Ultra high frequency" (UHF) generally designates the band of frequencies from about 300 MHz to about 3 GHz with weight wavelengths ranging from about 1 m to about 10 cm long.

"Super high frequency" (SHF) generally designates the band of frequencies from about 3 GHz to about 30 GHz with wavelengths ranging from about 10 cm to about 1 cm long.

"Extremely high frequency" (EHF) generally designates the band of frequencies from about 30 GHz to about 300 GHz with wavelengths ranging from about 1 cm to about 1 mm long.

"Far infrared" (FIR) generally designates a band of frequencies from about 300 GHz to about 20 THz with wavelengths ranging from about 1 mm to about 15 μm long.

"Long-wavelength infrared" (LWIR) generally designates a band of frequencies from about 20 THz to about 37 THz with wavelengths ranging from about 15 μm to about 8 μm long.

"Mid infrared" (MIR) generally designates a band of frequencies from about 37 THz to about 100 THz with wavelengths from about 8 μm to about 3 μm long.

"Short wavelength infrared" (SWIR) generally designates a band of frequencies from about 100 THz to about 214 THz with wavelengths from about 3 μm to about 1.4 μm long.

"Near-infrared" (NIR) generally designates a band of frequencies from about 214 THz to about 400 THz with wavelengths from about 1.4 μm to about 750 nm long.

"Visible light" generally designates a band of frequencies from about 400 THz to about 750 THz with wavelengths from about 750 nm to about 400 nm long.

"Near ultraviolet" (NUV) generally designates a band of frequencies from about 750 THz to about 1 PHz with wavelengths from about 400 nm to about 300 nm long.

"Middle ultraviolet" (MUV) generally designates a band of frequencies from about 1 PHz to about 1.5 PHz with wavelengths from about 300 nm to about 200 nm long.

"Far ultraviolet" (FUV) generally designates a band of frequencies from about 1.5 PHz to about 2.48 PHz with wavelengths from about 200 nm to about 122 nm long.

"Extreme ultraviolet" (EUV) generally designates a band of frequencies from about 2.48 PHz to about 30 PHz with wavelengths from about 121 nm to about 10 nm long.

"Soft x-rays" (SX) generally designates a band of frequencies from about 30 PHz to about 3 EHz with wavelengths from about 10 nm to about 100 pm long.

"Hard x-rays" (HX) generally designates a band of frequencies from about 3 EHz to about 30 EHz with wavelengths from about 100 pm to about 10 pm long.

"Gamma rays" generally designates a band of frequencies above about 30 EHz with wavelengths less than about 10 pm long.

"Electromagnetic Waves" generally refers to waves having a separate electrical and a magnetic component. The electrical and magnetic components of an electromagnetic wave oscillate in phase and are always separated by a 90 degree angle. Electromagnetic waves can radiate from a source to create electromagnetic radiation capable of passing through a medium or through a vacuum. Electromagnetic waves include waves oscillating at any frequency in the electromagnetic spectrum including, but not limited to, radio waves, visible and invisible light, X-rays, and gamma-rays.

"Frequency Bandwidth" or "Band" generally refers to a contiguous range of frequencies defined by an upper and lower frequency. Frequency bandwidth is thus typically expressed as a number of hertz (cycles per second) representing the difference between the upper frequency and the lower frequency of the band and may or may not include the upper and lower frequencies themselves. A "band" can therefore be defined by a given frequency bandwidth for a given region and designated with generally agreed on terms. For example, the "20 meter band" in the United States is assigned the frequency range from 14 MHz to 14.35 MHz thus defining a frequency bandwidth of 0.35 MHz or 350 KHz. In another example, the International Telecommunication Union (ITU) has designated the frequency range from 300 Mhz to 3 GHz as the "UHF band".

"Fiber-optic communication" generally refers to a method of transmitting data from one place to another by sending pulses of electromagnetic energy through an optical fiber. The transmitted energy may form an electromagnetic carrier wave that can be modulated to carry data. Fiber-optic communication lines that use optical fiber cables to transmit data can be configured to have a high data bandwidth. For example, fiber-optic communication lines may have a high data bandwidth of up to about 15 Tbit/s, about 25 Tbit/s, about 100 Tbit/s, about 1 Pbit/s or more. Opto-electronic repeaters may be used along a fiber-optic communication line to convert the electromagnetic energy from one segment of fiber-optic cable into an electrical signal. The repeater can retransmit the electrical signal as electromagnetic energy along another segment of fiber-optic cable at a higher signal strength than it was received.

"Financial instrument" generally refers to a tradable asset of any kind. General examples include, but are not limited to, cash, evidence of an ownership interest in an entity, or a contractual right to receive or deliver cash or another financial instrument. Specific examples include bonds, bills (e.g. commercial paper and treasury bills), stock, loans, deposits, certificates of deposit, bond futures or options on bond futures, short-term interest rate futures, stock options, equity futures, currency futures, interest rate swaps, interest rate caps and floors, interest rate options, forward rate agreements, stock options, foreign-exchange options, foreign-exchange swaps, currency swaps, or any sort of derivative.

"Fused data stream" generally refers to a combination of at least two or more separate data transmissions. The data transmissions may come from any desired source. For example, the data transmission may be in-band data, out-of-band data, public data, or private data. The fused data stream may be any desired combination of these different data transmissions.

"Ground" is used more in an electrical/electromagnetic sense and generally refers to the Earth's surface including land and bodies of water, such as oceans, lakes, and rivers.

"Ground-wave propagation" generally refers to a transmission method in which one or more electromagnetic waves are conducted via the boundary of the ground and atmosphere to travel along ground. The electromagnetic wave propagates by interacting with the semi-conductive surface of the earth. In essence, the wave clings to the surfaces so as to follow the curvature of the earth. Typically, but not always, the electromagnetic wave is in the form of a ground or surface wave formed by low-frequency radio waves.

"Identifier" generally refers to a name that identifies (that is, labels the identity of) either a unique thing or a unique class of things, where the "object" or class may be an idea, physical object (or class thereof), or physical substance (or class thereof). The abbreviation "ID" often refers to identity, identification (the process of identifying), or an identifier (that is, an instance of identification). An identifier may or may not include words, numbers, letters, symbols, shapes, colors, sounds, or any combination of those.

The words, numbers, letters, or symbols may follow an encoding system (wherein letters, digits, words, or symbols represent ideas or longer identifiers) or they may simply be arbitrary. When an identifier follows an encoding system, it is often referred to as a code or ID code. Identifiers that do not follow any encoding scheme are often said to be arbitrary IDs because they are arbitrarily assigned without meaning in any other context beyond identifying something.

"In-band data" generally refers to data that is collected from the main data transmission stream between two communication nodes. Typically, in-band data is the main data transmission sent by the transmitting party. This data may be collected and analyzed to determine the viability of transmitting data at a certain frequency at the ionospheric conditions during the time of transmission.

"Ionosphere" generally refers to the layer of the Earth's atmosphere that contains a high concentration of ions and free electrons and is able to reflect radio waves. The ionosphere includes the thermosphere as well as parts of the mesosphere and exosphere. The ionosphere extends from about 25 to about 600 miles (about 40 to 1,000 km) above the earth's surface. The ionosphere includes a number of layers that undergo considerable variations in altitude, density, and thickness, depending among a number of factors including solar activity, such as sunspots. The various layers of the ionosphere are identified below.

The "D layer" of the ionosphere is the innermost layer that ranges from about 25 miles (40 km) to about 55 miles (90 km) above the Earth's surface. The layer has the ability to refract signals of low frequencies, but it allows high frequency radio signals to pass through with some attenuation. The D layer normally, but not in all instances, disappears rapidly after sunset due to rapid recombination of its ions.

The "E layer" of the ionosphere is the middle layer that ranges from about 55 miles (90 km) to about 90 miles (145 km) above the Earth's surface. The E layer typically has the ability to refract signals with frequencies higher than the D layer. Depending on the conditions, the E layer can normally refract frequencies up to 20 MHz. The rate of ionic recombination in the E layer is somewhat rapid such that after sunset it almost completely disappears by midnight. The E layer can further include what is termed an "$E_s$ layer" or "sporadic E layer" that is formed by small, thin clouds of intense ionization. The sporadic E layer can reflect radio waves, even frequencies up to 225 MHz, although rarely. Sporadic E layers most often form during summer months, and it has skip distances of around 1,020 miles (1,640 km). With the sporadic E layer, one hop propagation can be about 560 miles (900 km) to up to 1,600 miles (2,500 km), and double hop propagation can be over 2,200 miles (3,500 km).

The "F layer" of the ionosphere is the top layer that ranges from about 90 (145 km) to 310 miles (500 km) or more above the Earth's surface. The ionization in the F layer is typically quite high and varies widely during the day, with the highest ionization occurring usually around noon. During daylight, the F layer separates into two layers, the F1 layer and the F2 layer. The F2 layer is outermost layer and, as such, is located higher than the F1 layer. Given the atmosphere is rarified at these altitudes, the recombination of ions occur slowly such that F layer remains constantly ionized, either day or night such that most (but not all) skywave propagation of radio waves occur in the F layer, thereby facilitating high frequency (HF) or short wave communication over long distances. For example, the F layers are able to refract high frequency, long distance transmissions for frequencies up to 30 MHz.

"Latency" generally refers to the time interval between a cause and an effect in a system. Latency is physically a consequence of the limited velocity with which any physical interaction can propagate throughout a system. Latency is physically a consequence of the limited velocity with which any physical interaction can propagate. The speed at which an effect can propagate through a system is always lower than or equal to the speed of light. Therefore every physical system that includes some distance between the cause and the effect will experience some kind of latency. For example, in a communication link or communications network, latency generally refers to the minimum time it takes for data to pass from one point to another. Latency with respect to communications networks may also be characterized as the time it takes energy to move from one point along the network to another. With respect to delays caused by the propagation of electromagnetic energy following a particular propagation path, latency can be categorized as follows:

"Low Latency" generally refers to a period of time that is less than or about equal to a propagation time that is 10% greater than the time required for light to travel a given propagation path in a vacuum. Expressed as a formula, low latency is defined as follows:

$$latency_{low} \leq \frac{d}{c} \cdot k \qquad \text{(Equation 1)}$$

where:
d=distance (miles)
c=the speed of light in a vacuum (186,000 miles/sec)
k=a scalar constant of 1.1

For example, light can travel 25,000 miles through a vacuum in about 0.1344 seconds. A "low latency" communication link carrying data over this 25,000 mile propagation path would therefore be capable of passing at least some portion of the data over the link in about 0.14784 seconds or less.

"High Latency" generally refers to a period of time that is over 10% greater than the time required for light to travel a given propagation path in a vacuum. Expressed as a formula, high latency is defined as follows:

$$latency_{high} > \frac{d}{c} \cdot k \qquad \text{(Equation 2)}$$

where:
d=distance (miles)
c=the speed of light in a vacuum (186,000 miles/sec)
k=a scalar constant of 1.1

For example, light can travel 8,000 miles through a vacuum in about 0.04301 seconds. A "high latency" communication link carrying data over this transmission path would therefore be capable of passing at least some portion of the data over the link in about 0.04731 seconds or more.

The "high" and "low" latency of a network may be independent of the data bandwidth. Some "high" latency networks may have a high transfer rate that is higher than a "low" latency network, but this may not always be the case. Some "low" latency networks may have a data bandwidth that exceeds the bandwidth of a "high" latency network.

"Maximum Usable Frequency (MUF)" generally refers to the highest frequency that is returned to the Earth using sky-wave propagation.

"Memory" generally refers to any storage system or device configured to retain data or information. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, each memory may be volatile, nonvolatile, or a hybrid combination of volatile and nonvolatile varieties.

"Noise" generally refers to one or more disturbances that interfere with and/or prevent reception of a signal and/or information.

"Non-sky-wave propagation" generally refers to all forms of transmission, wired and/or wireless, in which the information is not transmitted by reflecting an electromagnetic wave from the ionosphere.

"Optimum Working Frequency" generally refers to the frequency that provides the most consistent communication path via sky-wave propagation. It can vary over time depending on number of factors, such as ionospheric conditions and time of day. For transmissions using the F2 layer of the ionosphere the working frequency is generally around 85% of the MUF, and for the E layer, the optimum working frequency will generally be near the MUF.

"Optical Fiber" generally refers to an electromagnetic waveguide having an elongate conduit that includes a substantially transparent medium through which electromagnetic energy travels as it traverses the long axis of the conduit. Electromagnetic radiation may be maintained within the conduit by total internal reflection of the electromagnetic radiation as it traverses the conduit. Total internal reflection is generally achieved using optical fibers that include a substantially transparent core surrounded by a second substantially transparent cladding material with a lower index of refraction than the core.

Optical fibers are generally constructed of dielectric material that is not electrically conductive but is substantially transparent. Such materials may or may not include any combination of extruded glass such as silica, fluoride glass, phosphate glass, Chalcogenide glass, or polymeric material such as various types of plastic, or other suitable material and may be configured with any suitable cross-sectional shape, length, or dimension. Examples of electromagnetic energy that may be successfully passed through optical fibers include electromagnetic waves in the near-infrared, mid-infrared, and visible light portion of the electromagnetic spectrum, although electromagnetic energy of any suitable frequency may be used.

"Out-of-band data" generally refers to data that is collected from a channel that is independent of the channel through which the main data stream is transmitted. The out-of-band data may be data streams sent by skywave propagation by third parties or may be data streams sent by the transmitting party along a different channel than the main data transmission stream. The data collected may include ionospheric data, for example from an ionosonde, or may be general data that is collected and analyzed to determine the viability of transmitting data at a certain frequency at the current ionospheric conditions.

"Polarization" generally refers to the orientation of the electric field ("E-plane") of a radiated electromagnetic energy wave with respect to the Earth's surface and is determined by the physical structure and orientation of the radiating antenna. Polarization can be considered separately from an antenna's directionality. Thus, a simple straight wire antenna may have one polarization when mounted abstention the vertically, and a different polarization when mounted substantially horizontally. As a transverse wave, the magnetic field of a radio wave is at right angles to that of the electric field, but by convention, talk of an antenna's "polarization" is understood to refer to the direction of the electric field.

Reflections generally affect polarization. For radio waves, one important reflector is the ionosphere which can change the wave's polarization. Thus for signals received via reflection by the ionosphere (a skywave), a consistent polarization cannot be expected. For line-of-sight communications or ground wave propagation, horizontally or vertically polarized transmissions generally remain in about the same polarization state at the receiving location. Matching the receiving antenna's polarization to that of the transmitter may be especially important in ground wave or line of sight propagation but may be less important in skywave propagation.

An antenna's linear polarization is generally along the direction (as viewed from the receiving location) of the antenna's currents when such a direction can be defined. For instance, a vertical whip antenna or Wi-Fi antenna vertically oriented will transmit and receive in the vertical polarization. Antennas with horizontal elements, such as most rooftop TV antennas, are generally horizontally polarized (because broadcast TV usually uses horizontal polarization). Even when the antenna system has a vertical orientation, such as an array of horizontal dipole antennas, the polarization is in the horizontal direction corresponding to the current flow.

Polarization is the sum of the E-plane orientations over time projected onto an imaginary plane perpendicular to the direction of motion of the radio wave. In the most general case, polarization is elliptical, meaning that the polarization of the radio waves varies over time. Two special cases are linear polarization (the ellipse collapses into a line) as we have discussed above, and circular polarization (in which the two axes of the ellipse are equal). In linear polarization the electric field of the radio wave oscillates back and forth along one direction; this can be affected by the mounting of the antenna but usually the desired direction is either horizontal or vertical polarization. In circular polarization, the electric field (and magnetic field) of the radio wave rotates At the radio frequency circularly around the axis of propagation.

"Precondition" generally refers to the alteration of a waveform of an information-bearing signal before and/or during transmission so that distortions in the received waveform are reduced and/or eliminated. In one non-limiting example, an inverse function of the measured and/or predicted distortion is applied to the transmitted signal so as to correct for distortions. Some alterations to precondition the signal can include changes to amplitude, harmonics, frequency, phase, and/or polarization of the waveform, to name just a few examples. These alterations can include linear, nonlinear, systematic, and/or random characteristics. Precondition alterations can include analog and/or digital changes.

"Private data" generally refers to ionospheric data that is collected from sources that are not available to the general public. Private data may be historical or current ionospheric data collected by the party that is performing data transmission, or may be ionospheric data that is purchased from a third party by the party that is performing data transmission. Private data may also be high frequency data transmissions sent by skywave propagation that may be collected and analyzed for transmission properties, such as distortion, that may indicate the viability of a certain transmission frequency.

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement, such as one or more PENTIUM, i3, i5 or i7 processors supplied by INTEL Corporation of 2200 Mission College Boulevard, Santa Clara, Calif. 95052, USA.

Another example of a processor is an Application-Specific Integrated Circuit (ASIC). An ASIC is an Integrated Circuit (IC) customized to perform a specific series of logical operations is controlling the computer to perform specific tasks or functions. An ASIC is an example of a processor for a special purpose computer, rather than a processor configured for general-purpose use. An application-specific integrated circuit generally is not reprogrammable to perform other functions and may be programmed once when it is manufactured.

In another example, a processor may be of the "field programmable" type. Such processors may be programmed multiple times "in the field" to perform various specialized or general functions after they are manufactured. A field-programmable processor may include a Field-Programmable Gate Array (FPGA) in an integrated circuit in the processor. FPGA may be programmed to perform a specific series of instructions which may be retained in nonvolatile memory cells in the FPGA. The FPGA may be configured by a customer or a designer using a hardware description language (HDL). In FPGA may be reprogrammed using another computer to reconfigure the FPGA to implement a new set of commands or operating instructions. Such an operation may be executed in any suitable means such as by a firmware upgrade to the processor circuitry.

Just as the concept of a computer is not limited to a single physical device in a single location, so also the concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, the unknown number may automatically change over time as well.

The concept of a "processor" includes a device configured or programmed to make threshold comparisons, rules comparisons, calculations, or perform logical operations applying a rule to data yielding a logical result (e.g. "true" or "false"). Processing activities may occur in multiple single processors on separate servers, on multiple processors in a single server with separate processors, or on multiple processors physically remote from one another in separate computing devices.

"Public data" generally refers to ionospheric data that is freely available to the public or any interested party. Public data may be ionosonde data collected and made available by governmental agencies such as NASA, the National Oceanic and Atmospheric Administration (NOAA), or any other public entity that collects and distributes ionospheric data. Public data may be historic data or real-time data. Public data may also be high frequency data transmissions sent by skywave propagation that may be collected and analyzed for transmission properties, such as distortion, that may indicate the viability of a certain transmission frequency.

"Radio" generally refers to electromagnetic radiation in the frequencies that occupy the range from 3 kHz to 300 GHz.

"Radio horizon" generally refers the locus of points at which direct rays from an antenna are tangential to the ground. The radio horizon can be approximated by the following equation:

$$d \cong \sqrt{2h_t} + \sqrt{2h_r} \quad \text{(Equation 3)}$$

where:
d=radio horizon (miles)
$h_t$=transmitting antenna height (feet)
$h_r$=receiving antenna height (feet).

"Remote" generally refers to any physical, logical, or other separation between two things. The separation may be relatively large, such as thousands or millions of miles or kilometers, or small such as nanometers or millionths of an inch. Two things "remote" from one another may also be logically or physically coupled or connected together.

"Receive" generally refers to accepting something transferred, communicated, conveyed, relayed, dispatched, or forwarded. The concept may or may not include the act of listening or waiting for something to arrive from a transmitting entity. For example, a transmission may be received without knowledge as to who or what transmitted it. Likewise the transmission may be sent with or without knowledge of who or what is receiving it. To "receive" may include, but is not limited to, the act of capturing or obtaining electromagnetic energy at any suitable frequency in the electromagnetic spectrum. Receiving may occur by sensing electromagnetic radiation. Sensing electromagnetic radiation may involve detecting energy waves moving through or from a medium such as a wire or optical fiber. Receiving includes receiving digital signals which may define various types of analog or binary data such as signals, datagrams, packets and the like.

"Receiving Station" generally refers to a receiving device, or to a location facility having multiple devices configured to receive electromagnetic energy. A receiving station may be configured to receive from a particular transmitting entity, or from any transmitting entity regardless of whether the transmitting entity is identifiable in advance of receiving the transmission.

"Reflection point" generally refers to the location in the ionosphere at which a radio wave is refracted by the ionosphere so that it begins to travel back to the surface of the earth rather than further into the atmosphere.

"Sensor" generally refers to any device that detects or measures a physical property. The physical property that is measured may be an atmospheric condition, but this is not required. For example, a sensor may measure atmospheric conditions, such as ionospheric height. A sensor may also collect data related to temperature, wind speed, lightning, or any of a number of other weather related parameters. A sensor may be limited to the measurement of a single physical property or may be capable of measuring several different physical properties.

"Skip distance" generally refers to the minimum distance from a transmitter to where a wave from sky-wave propagation can be returned to the Earth. To put it another way, the skip distance is the minimum distance that occurs at the critical angle for sky-wave propagation.

"Skip zone" or "quiet zone" generally refers to is an area between the location where a ground wave from ground wave propagation is completely dissipated and the location where the first sky wave returns using sky wave propagation. In the skip zone, no signal for a given transmission can be received.

"Satellite communication" or "satellite propagation" generally refers to transmitting one or more electromagnetic signals to a satellite which in turn reflects and/or retransmits the signal to another satellite or station.

"Size" generally refers to the extent of something; a thing's overall dimensions or magnitude; how big something is. For physical objects, size may be used to describe relative terms such as large or larger, high or higher, low or lower, small or smaller, and the like. Size of physical objects may also be given in fixed units such as a specific width, length, height, distance, volume, and the like expressed in any suitable units.

For data transfer, size may be used to indicate a relative or fixed quantity of data being manipulated, addressed, transmitted, received, or processed as a logical or physical unit. Size may be used in conjunction with the amount of data in a data collection, data set, data file, or other such logical unit. For example, a data collection or data file may be characterized as having a "size" of 35 Mbytes, or a communication link may be characterized as having a data bandwidth with a "size" of 1000 bits per second.

"Sky-wave propagation" refers generally to a transmission method in which one or more electromagnetic-waves radiated from an antenna are refracted from the ionosphere back to the ground. Sky-wave propagation further includes tropospheric scatter transmissions. In one form, a skipping method can be used in which the waves refracted from the ionosphere are reflected by the ground back up to the ionosphere. This skipping can occur more than once.

"Space-wave propagation" or sometimes referred to as "direct wave propagation" or "line-of-sight propagation" generally refers to a transmission method in which one or more electromagnetic waves are transmitted between antennas that are generally visible to one another. The transmission can occur via direct and/or ground reflected space waves. Generally speaking, the antenna height and curvature of the earth are limiting factors for the transmission distances for space-wave propagation. The actual radio horizon for a direct line of sight is larger than the visible or geometric line of sight due to diffraction effects; that is, the radio horizon is about 4/5 greater than the geometric line of sight.

"Spread spectrum" generally refers to a transmission method that includes sending a portion of a transmitted signal over multiple frequencies. The transmission over multiple frequencies may occur simultaneously by sending a portion of the signal on various frequencies. In this example, a receiver must listen to all frequencies simultaneously in order to reassemble the transmitted signal. The transmission may also be spread over multiple frequencies by "hopping" signals. A signal hopping scenario includes transmitting the signal for some period of time over a first frequency, switching to transmit the signal over a second frequency for a second period of time, before switching to a third frequency for a third period of time, and so forth. The receiver and transmitter must be synchronized in order to switch frequencies together. This process of "hopping" frequencies may be implemented in a frequency-hopping pattern that may change over time (e.g. every hour, every 24 hours, and the like).

"Stratosphere" generally refers to a layer of the Earth's atmosphere extending from the troposphere to about 25 to 35 miles above the earth surface.

"Transfer Rate" generally refers to the rate at which a something is moved from one physical or logical location to another. In the case of a communication link or communication network, a transfer rate may be characterized as the rate of data transfer over the link or network. Such a transfer rate may be expressed in "bits per second" and may be limited by the maximum data bandwidth for a given network or communication link used to carry out a transfer of data.

"Transmission frequency model" generally refers to a method of determining a suitable frequency for data transmission along a consistent communication path via skywave propagation. The transmission frequency model may be used to determine a suitable frequency for transmission in real time and/or may be used to predict future suitable frequencies as well as when to switch frequency of data transmission. A transmission frequency model may accept various types of data as an input, for example transmitted data streams, environmental data, historical data, and any other desired types of data for determining a transmission frequency. In some instances, a transmission frequency model may be a computer program and stored in computer memory and operable using a computer processor.

"Transmission line" generally refers to a specialized physical structure or series of structures designed to carry electromagnetic energy from one location to another, usually without radiating the electromagnetic energy through free space. A transmission line operates to retain and transfer electromagnetic energy from one location to another while minimizing latency and power losses incurred as the electromagnetic energy passes through the structures in the transmission line.

Examples of transmission lines that may be used in communicating radio waves include twin lead, coaxial cable, microstrip, strip line, twisted-pair, star quad, lecher lines, various types of waveguide, or a simple single wire line. Other types of transmission lines such as optical fibers may be used for carrying higher frequency electromagnetic radiation such as visible or invisible light.

"Transmission Path" or "Propagation Path" generally refers to path taken by electromagnetic energy passing through space or through a medium. This can include transmissions through a transmission line. In this case, the transmission path is defined by, follows, is contained within, passes through, or generally includes the transmission line. A transmission or propagation path need not be defined by a transmission line. A propagation or transmission path can be defined by electromagnetic energy moving through free space or through the atmosphere such as in skywave, ground wave, line-of-site, or other forms of propagation. In that case, the transmission path can be characterized as any path along which the electromagnetic energy passes as it is moves from the transmitter to the receiver, including any skip, bounce, scatter, or other variations in the direction of the transmitted energy.

"Transmission Station" generally refers to a transmitting device, or to a location or facility having multiple devices configured to transmit electromagnetic energy. A transmission station may be configured to transmit to a particular receiving entity, to any entity configured to receive transmission, or any combination thereof.

"Transmit" generally refers to causing something to be transferred, communicated, conveyed, relayed, dispatched, or forwarded. The concept may or may not include the act of conveying something from a transmitting entity to a receiving entity. For example, a transmission may be received without knowledge as to who or what transmitted it. Likewise the transmission may be sent with or without knowledge of who or what is receiving it. To "transmit" may include, but is not limited to, the act of sending or broadcasting electromagnetic energy at any suitable frequency in the electromagnetic spectrum. Transmissions may include digital signals which may define various types of binary data such as datagrams, packets and the like. A transmission may also include analog signals.

"Triggering Data" generally refers to data that includes triggering information identifying one or more commands to execute. The triggering data and the command data may occur together in a single transmission or may be transmitted separately along a single or multiple communication links.

"Troposphere" generally refers to the lowest portion of the Earth's atmosphere. The troposphere extends about 11 miles above the surface of the earth in the mid-latitudes, up to 12 miles in the tropics, and about 4.3 miles in winter at the poles.

"Tropospheric scatter transmission" generally refers to a form of sky-wave propagation in which one or more electromagnetic waves, such as radio waves, are aimed at the troposphere. While not certain as to its cause, a small amount of energy of the waves is scattered forwards to a receiving antenna. Due to severe fading problems, diversity reception techniques (e.g., space, frequency, and/or angle diversity) are typically used.

"Wave Guide" generally refers to a transmission line configured to guides waves such as electromagnetic waves occurring at any frequency along the electromagnetic spectrum. Examples include any arrangement of conductive or insulative material configured to transfer lower frequency electromagnetic radiation ranging along the electromagnetic spectrum from extremely low frequency to extremely high frequency waves. Others specific examples include optical fibers guiding high-frequency light or hollow conductive metal pipe used to carry high-frequency radio waves, particularly microwaves.

It should be noted that the singular forms "a", "an", "the", and the like as used in the description and/or the claims include the plural forms unless expressly discussed otherwise. For example, if the specification and/or claims refer to "a device" or "the device", it includes one or more of such devices.

It should be noted that directional terms, such as "up", "down", "top" "bottom", "fore", "aft", "lateral", "longitudinal", "radial", "circumferential", etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

What is claimed is:

1. A system comprising:
    a first communication node configured to transmit a first data signal as an electromagnetic wave along a first data transmission path using skywave propagation and to transmit a second data signal along a second data transmission path, wherein the first data signal is identical to second data signal;
    a second communication node configured to receive the first data signal and the second data signal transmitted from the first communication node, and wherein the second communication node includes a processor configured to decode and compare the first data signal to the second data signal received at the second communication node;
    wherein differences between the first data signal and the second data signal received at the second communication node indicate distortions caused by skywave propagation;
    wherein the distortions in the first data signal are communicated to the first communication node so that a third data signal transmitted by the first communication node is preconditioned to correspond with the distortions caused by skywave propagation; and
    wherein the third data signal includes instructions for a trading strategy of at least one financial instrument.

2. The system of claim 1, wherein the second data transmission path is a wired transmission line from the first communication node to the second communication node.

3. The system of claim 1, wherein the second data transmission path includes a fiber optic cable.

4. The system of claim 1, wherein the first and second data signals are decoded using at least two different decoding methods, and wherein decoded signal resulting from the at least two different decoding methods that takes a shortest time is processed.

5. The system of claim 4, wherein the at least two decoding methods are performed in parallel.

6. The system of claim 4, wherein the at least two decoding methods are performed sequentially.

7. The system of claim 1, wherein the distortions in the first data signal are communicated to the first communication node by the second data transmission path.

8. A method comprising:
    sending a first data signal from a transmitter to a receiver by a first data transmission path using skywave propagation;
    sending a second data signal from the transmitter to the receiver by a second data transmission path, wherein the second data signal is identical to the first data signal;
    decoding the received first data signal and the received second data signal at the receiver;
    comparing the received first data signal to the received second data signal, wherein differences between the received first data signal and the received second data signal indicate distortions caused during the skywave propagation of the first data signal;
    transmitting data regarding the distortions in the received first data signal from the receiver to the transmitter; and
    preconditioning a third data signal, wherein the preconditioning of the third data signal corresponds to the distortions in the received first data signal, wherein the third data signal includes instructions for a trading strategy of at least one financial instrument.

9. The method of claim 8, further comprising:
sending the preconditioned third data signal from the transmitter to the receiver by skywave propagation.

10. The method of claim 8, wherein the received first data signal is decoded using at least two different decoding methods, and wherein decoded signal resulting from the at least two different decoding methods that takes a shortest time is processed.

11. The method of claim 10, wherein the at least two decoding methods are performed in parallel.

12. The method of claim 10, wherein the at least two decoding methods are performed sequentially.

13. The method of claim 8, wherein the second data transmission path is a wired transmission line from the transmitter to the receiver.

14. The method of claim 8, wherein the second data transmission path includes a fiber optic cable.

15. The method of claim 8, wherein the data regarding the distortions in the first data signal are transmitted from the receiver to the transmitter by the second data transmission path.

16. The method of claim 8, wherein the data regarding the distortions in the first data signal are transmitted from the receiver to the transmitter by both the first data transmission path and the second data transmission path.

17. A method comprising:
transmitting a preconditioned data signal from a first communication node using skywave propagation, wherein the preconditioned data signal includes instructions for a trading strategy of at least one financial instrument;
receiving the preconditioned data signal at a second communication node;
performing a first decoding method on the data signal;
performing a second decoding method on the data signal at the same time as the first decoding method; and
processing the data signal resulting from the first decoding method or the second decoding method that is quickest to decode the data signal.

18. The method of claim 17, wherein the second decoding method is more computationally expensive than the first decoding method.

19. The method of claim 17, further comprising:
performing a third decoding method on the data signal at the same time as the first and second decoding methods.

20. The method of claim 19, wherein the third decoding method is more computationally expensive than both the first decoding method and the second decoding method.

* * * * *

UNITED STATES PATENT AND TRADEMARK OFFICE
CERTIFICATE OF CORRECTION

| | |
|---|---|
| PATENT NO. | : 11,575,430 B2 |
| APPLICATION NO. | : 17/305262 |
| DATED | : February 7, 2023 |
| INVENTOR(S) | : Kevin J. Babich |

It is certified that error appears in the above-identified patent and that said Letters Patent is hereby corrected as shown below:

In the Claims

Column 28, Claim 4, Line 39, replace "methods, and wherein decoded signal resulting from the at" with --methods, and wherein a decoded signal resulting from the at--

Column 29, Claim 10, Line 9, replace "methods, and wherein decoded signal resulting from the" with --methods, and wherein a decoded signal resulting from the--

Signed and Sealed this
Sixteenth Day of May, 2023

Katherine Kelly Vidal
*Director of the United States Patent and Trademark Office*